Figure 58:
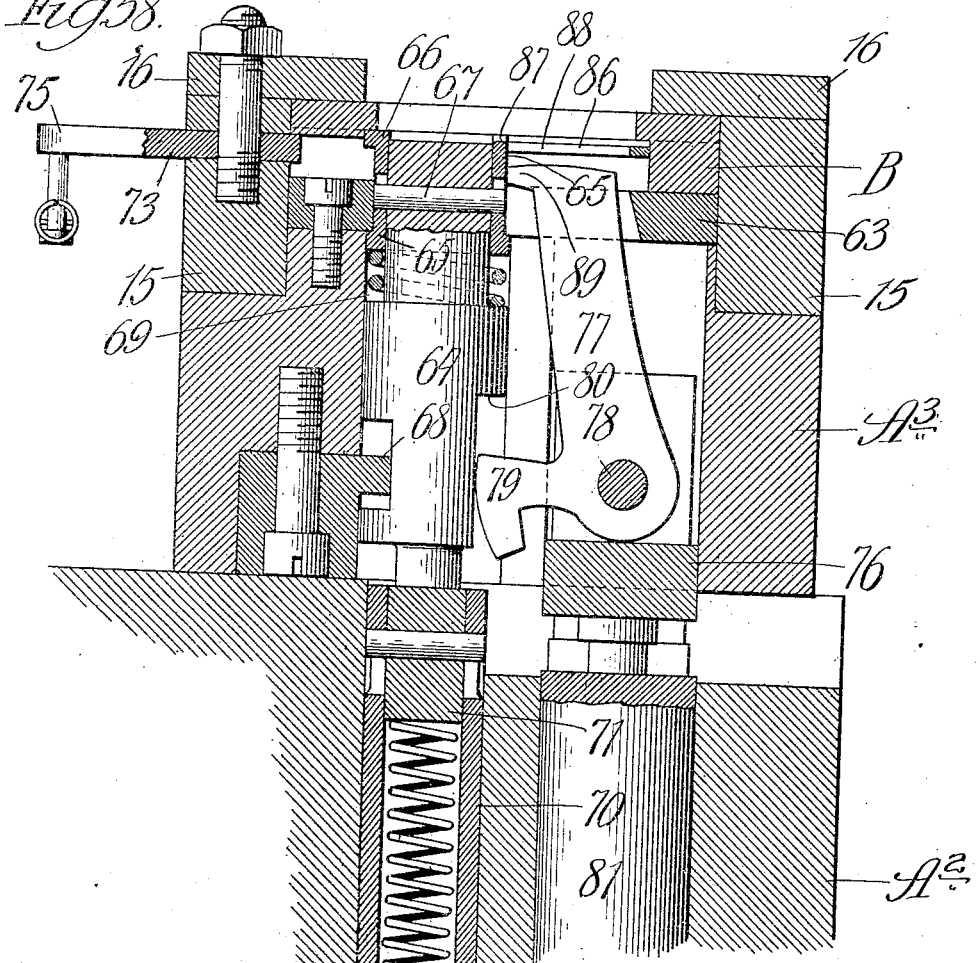

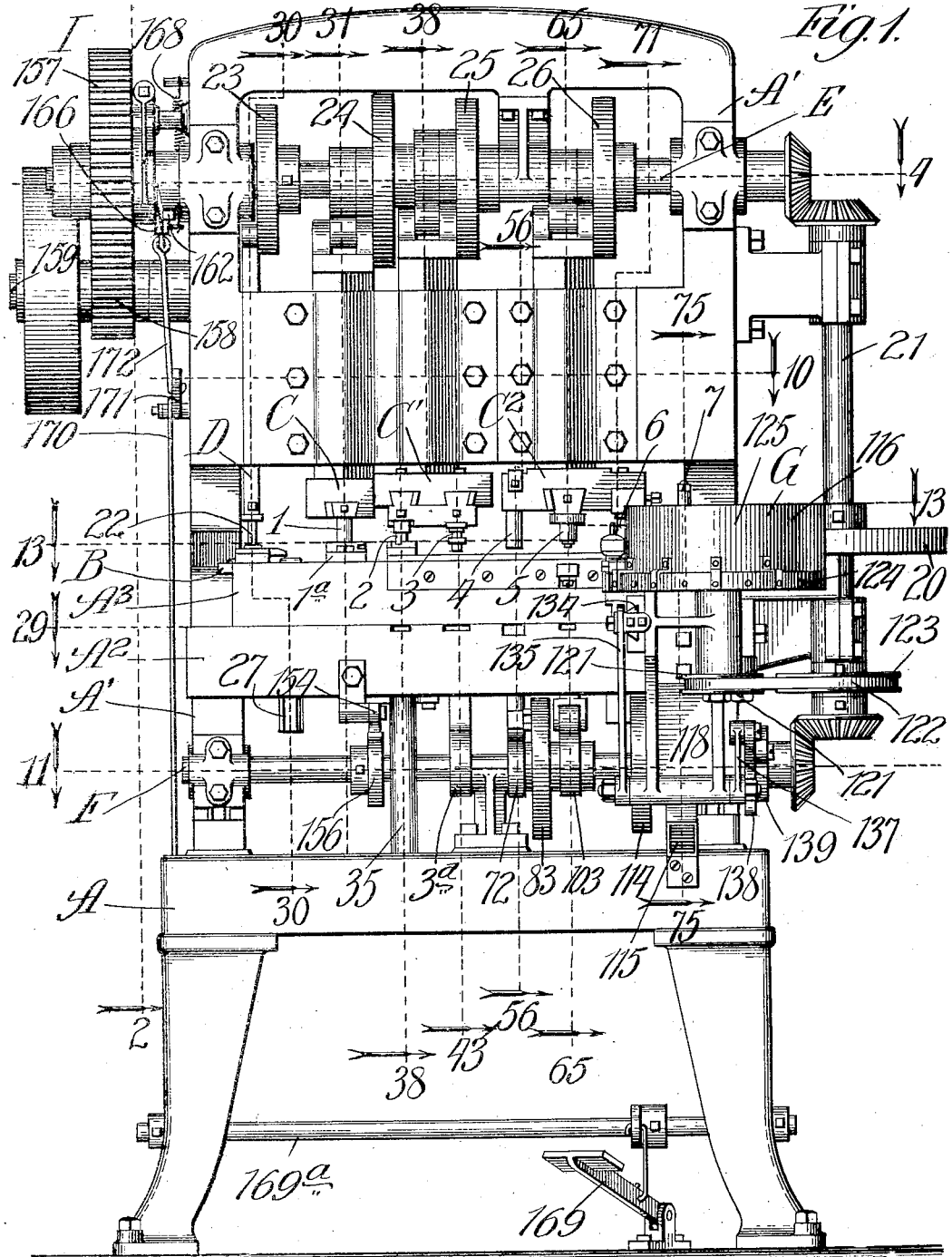

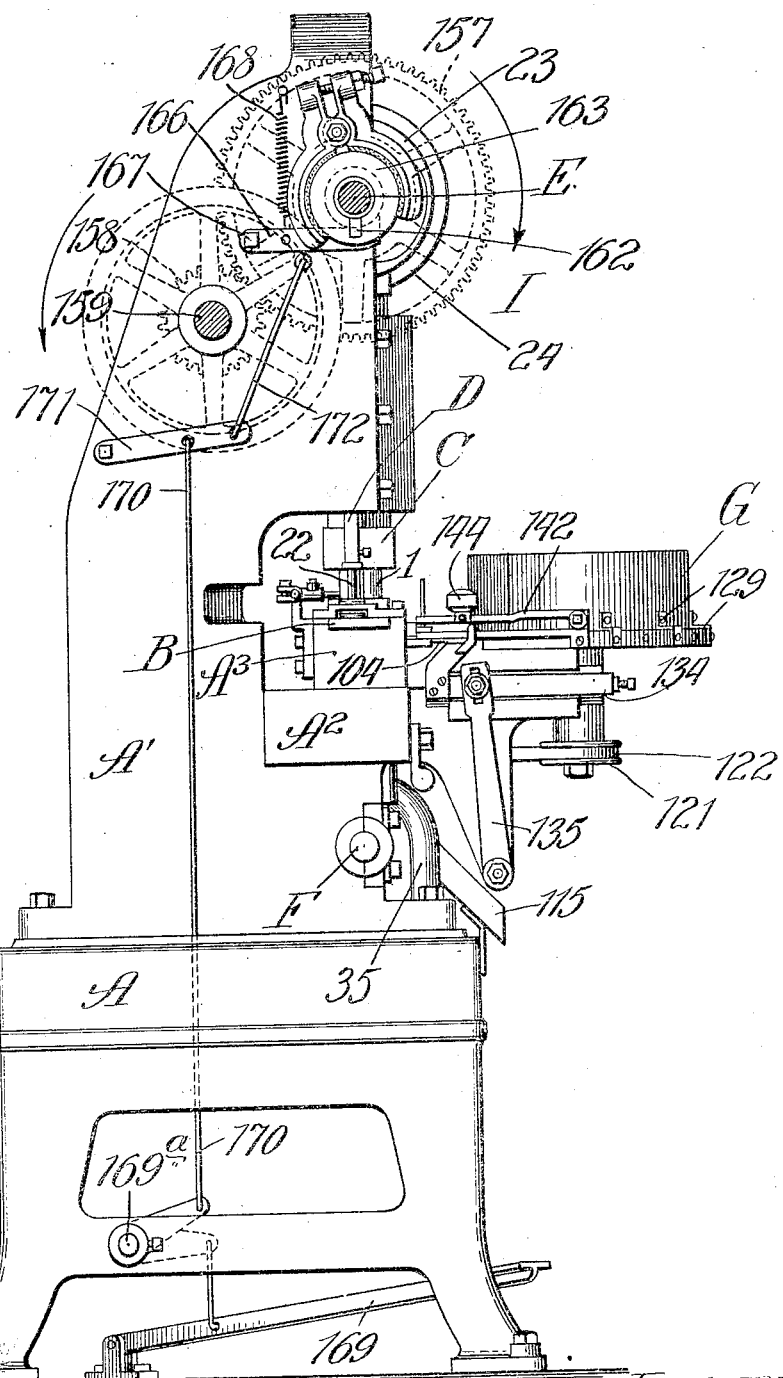

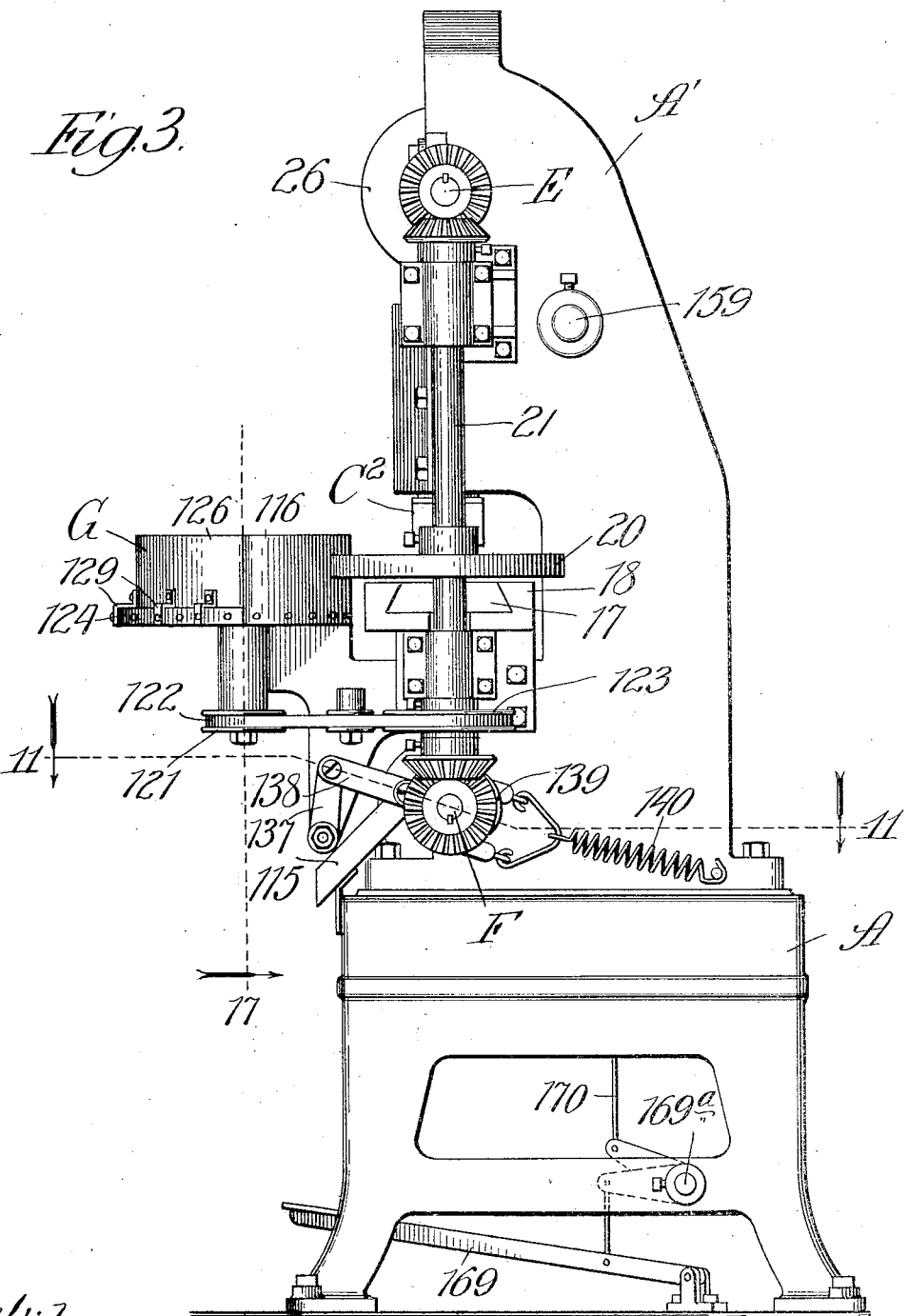

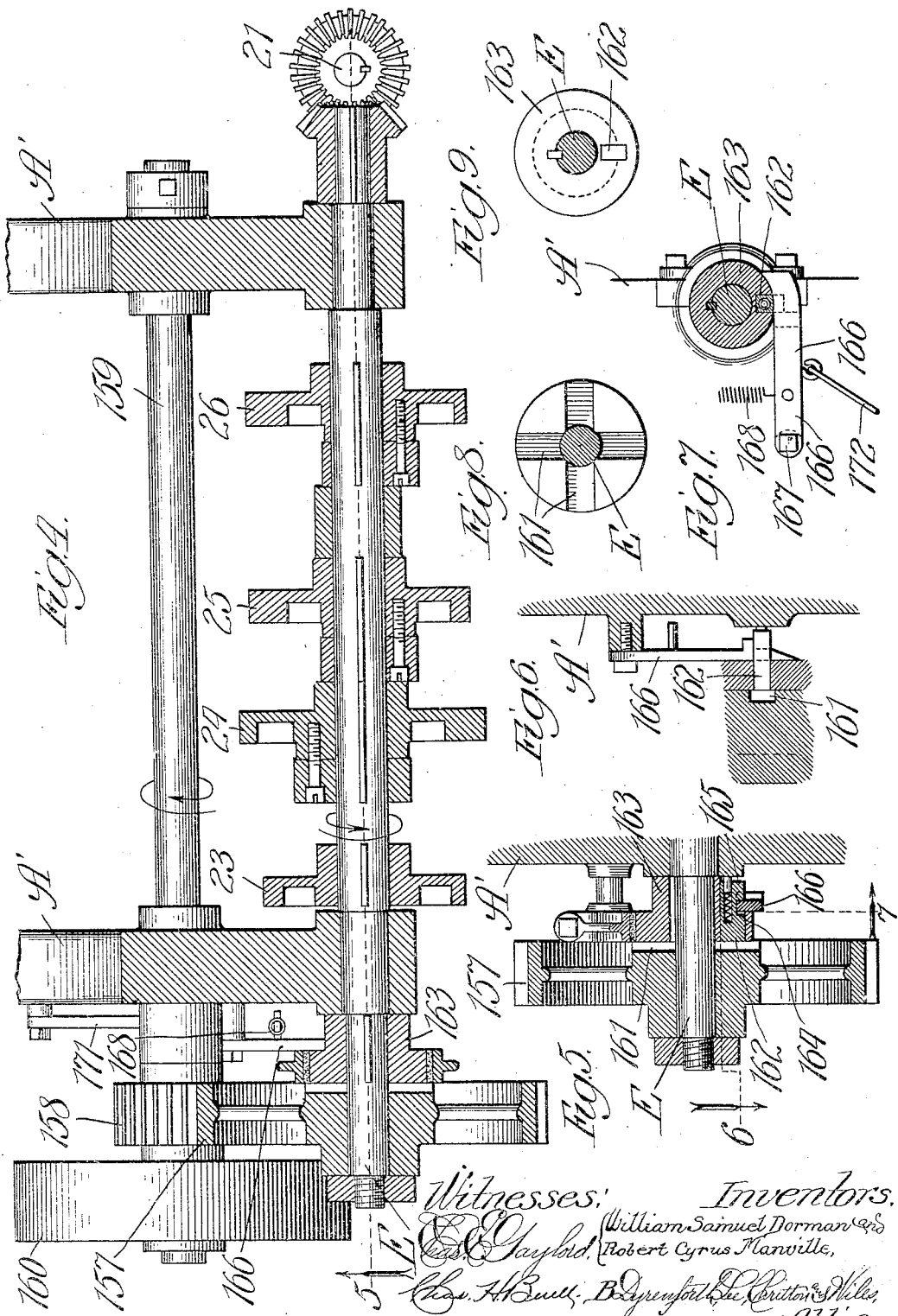

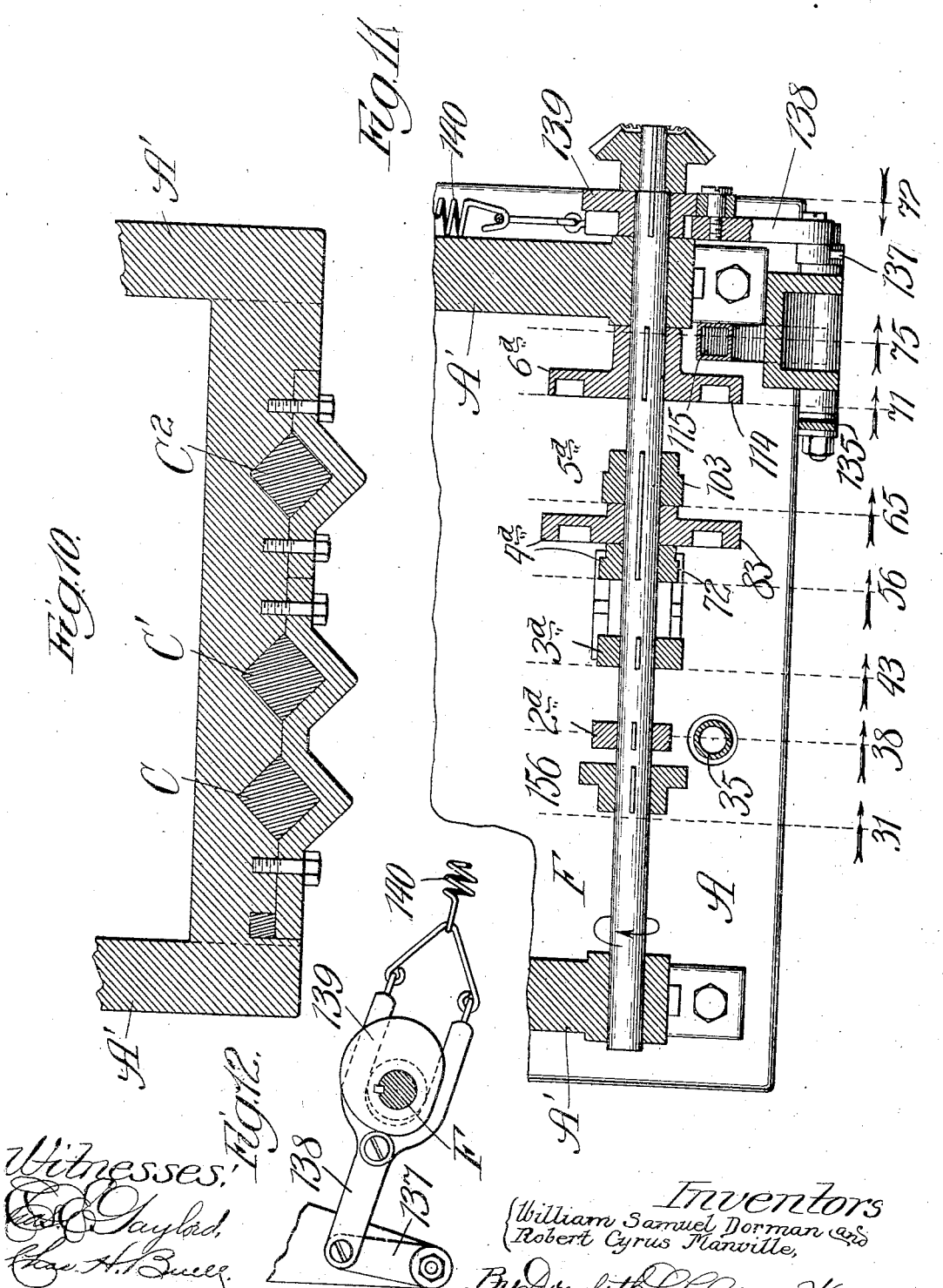

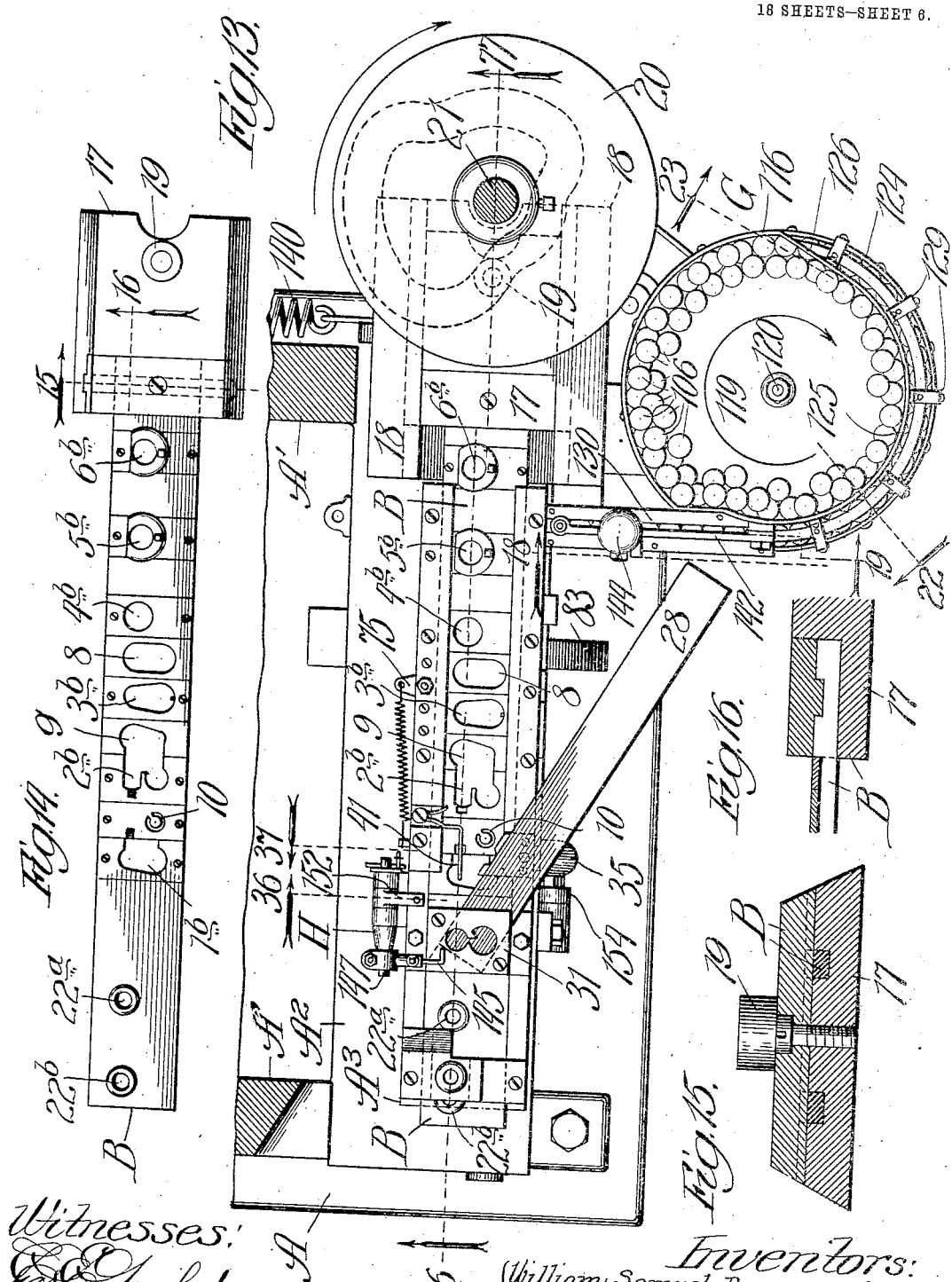

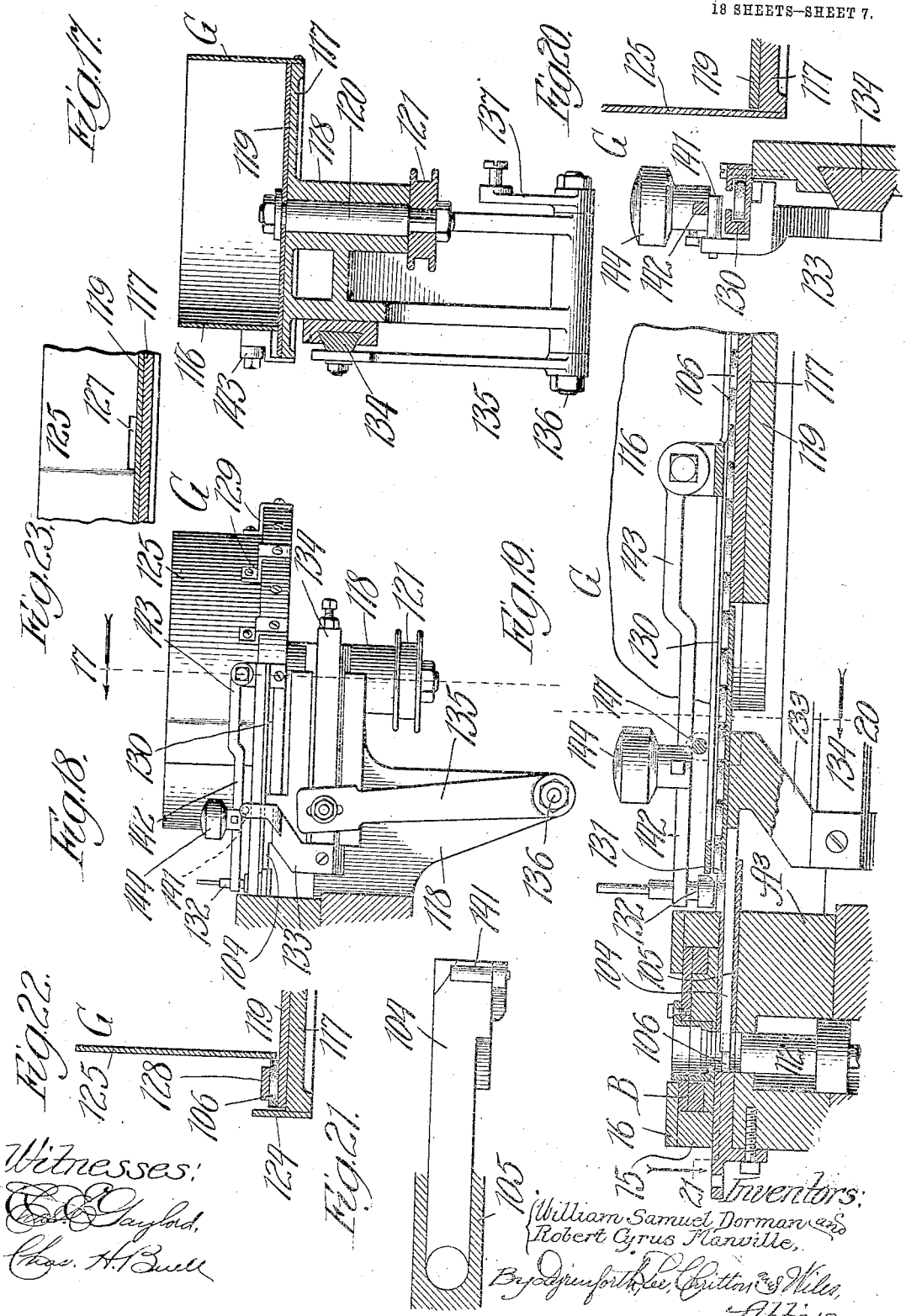

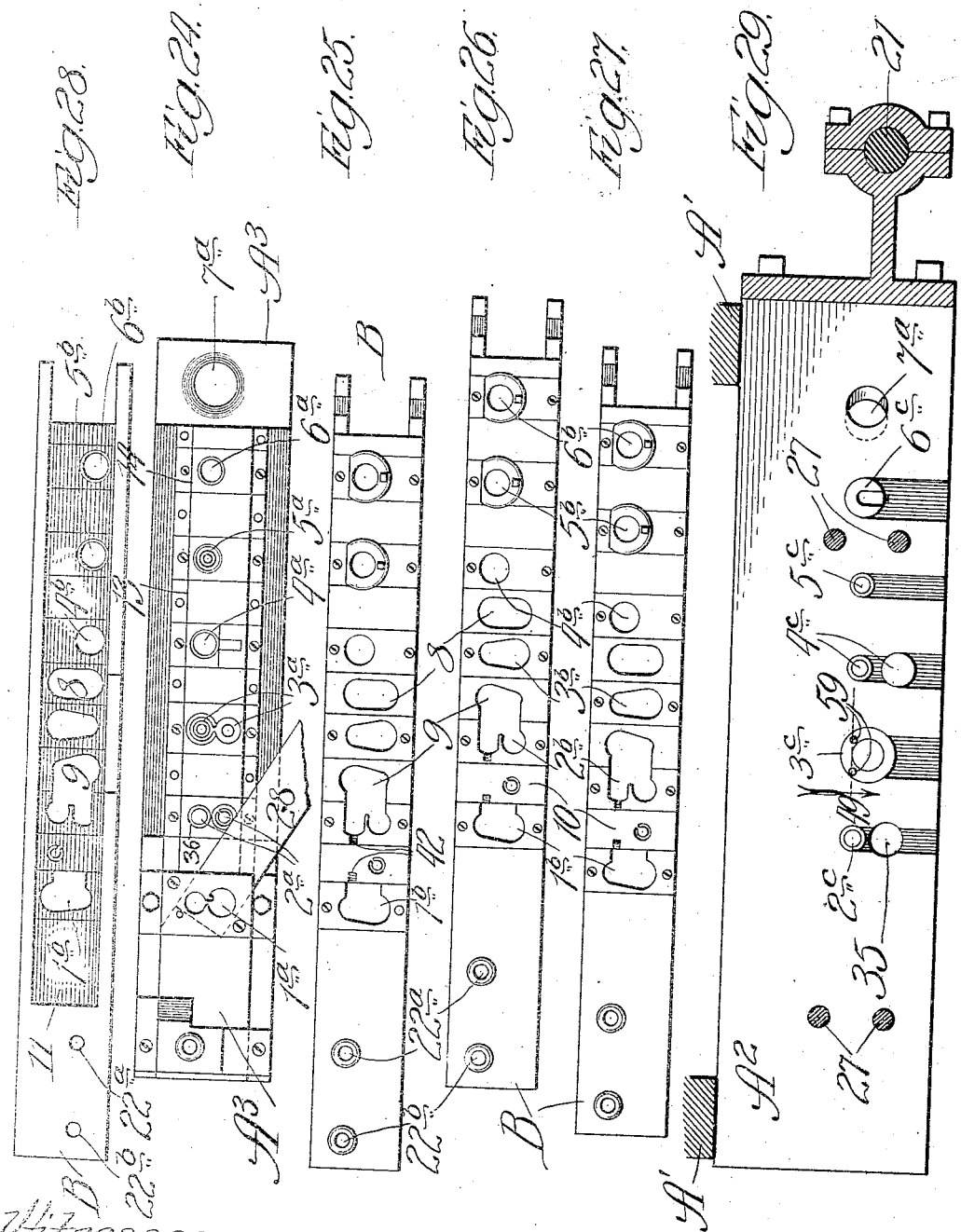

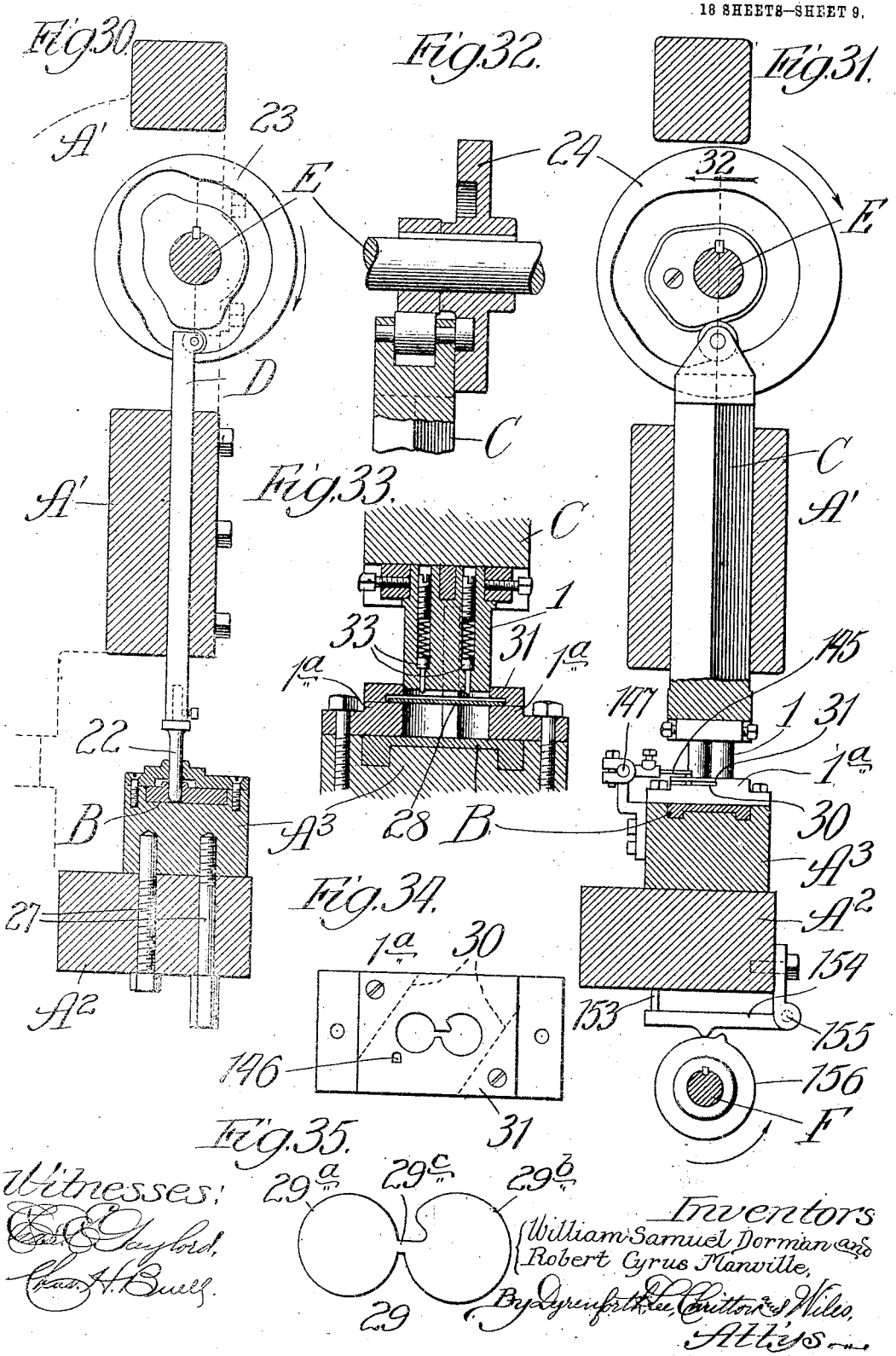

W. S. DORMAN & R. C. MANVILLE.
STOPPER MAKING MACHINE.
APPLICATION FILED SEPT. 19, 1911.
1,039,661.
Patented Sept. 24, 1912.
18 SHEETS—SHEET 10.
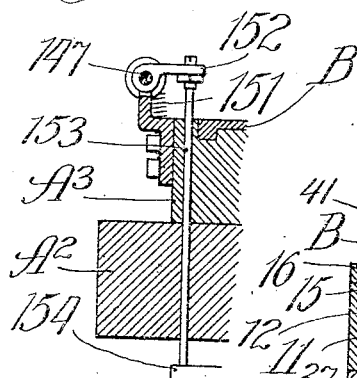
Fig. 36.
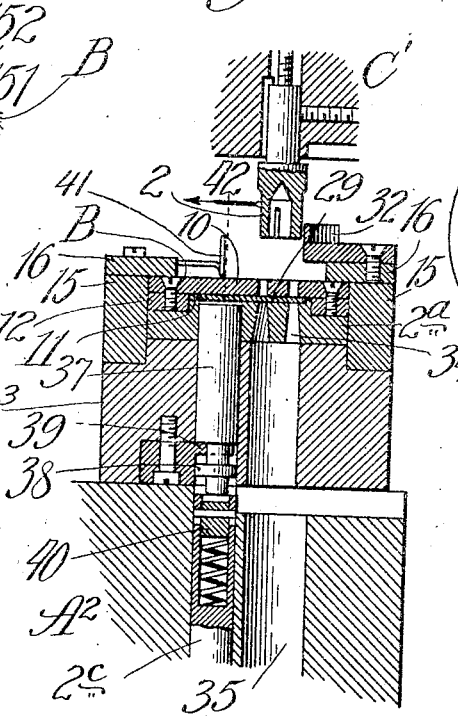
Fig. 39.
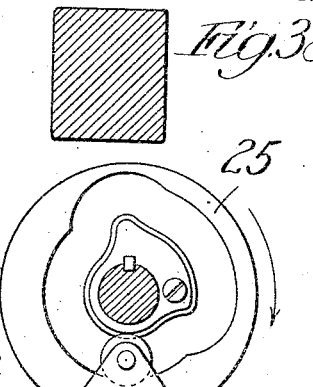
Fig. 38.
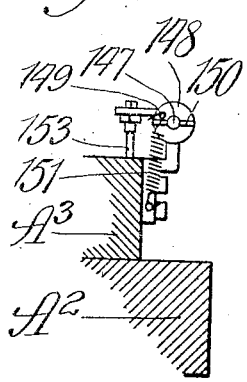
Fig. 37.
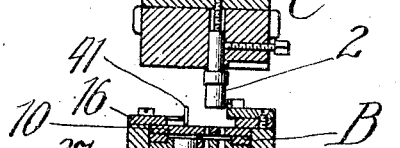
Fig. 42.
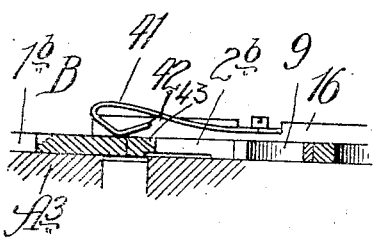
Fig. 40.
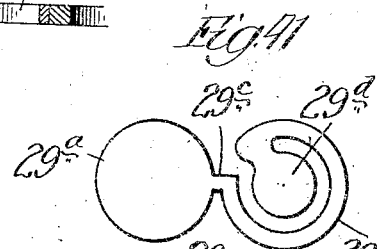
Fig. 41.
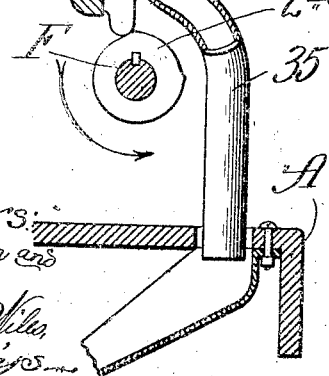
Witnesses:
Inventors:
William Samuel Dorman and
Robert Cyrus Manville, W. S. DORMAN & R. C. MANVILLE.
STOPPER MAKING MACHINE.
APPLICATION FILED SEPT. 19, 1911.
1,039,661.
Patented Sept. 24, 1912.
18 SHEETS—SHEET 11.
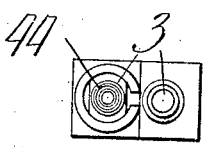
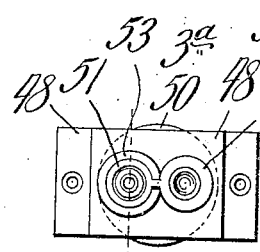
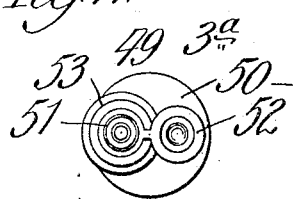
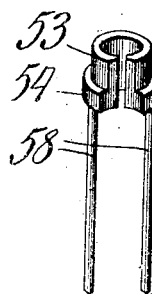
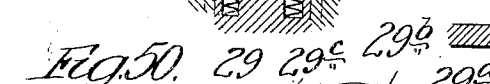
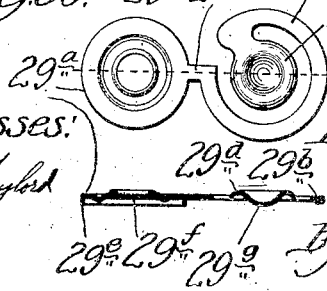
Witnesses:
Inventors
William Samuel Dorman and
Robert Cyrus Manville,

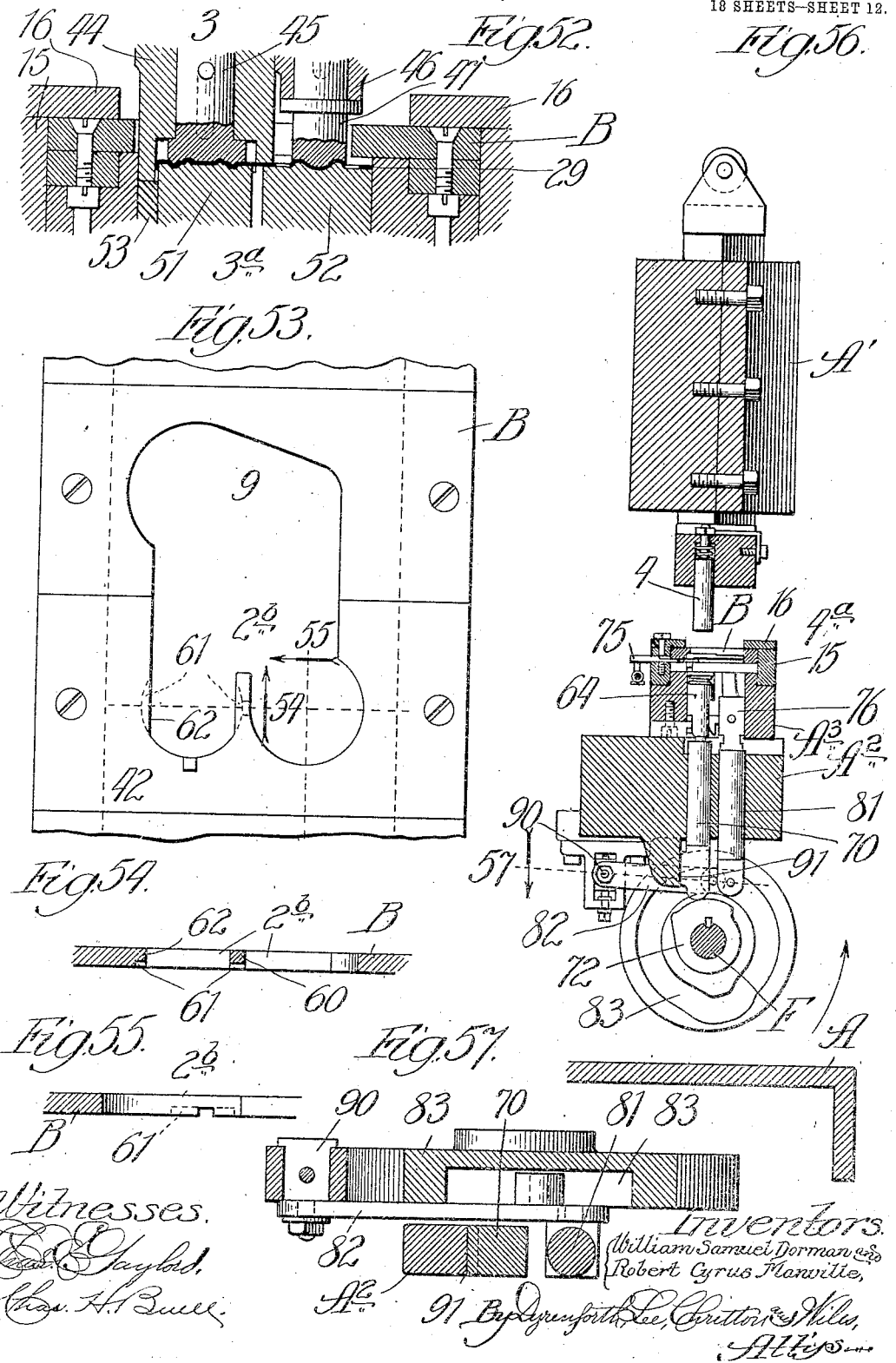

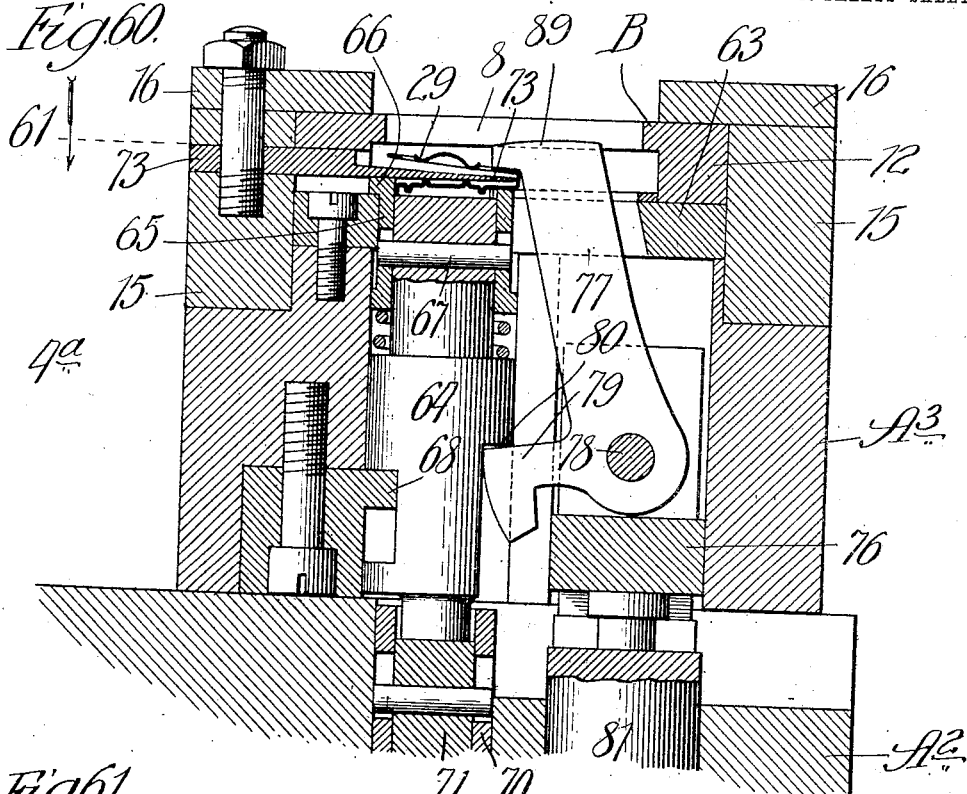
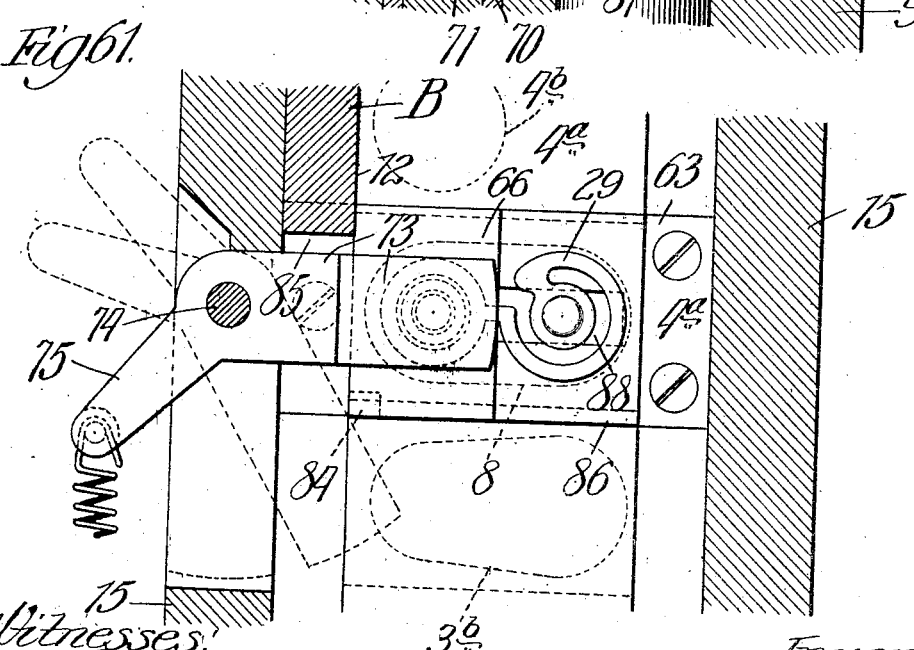

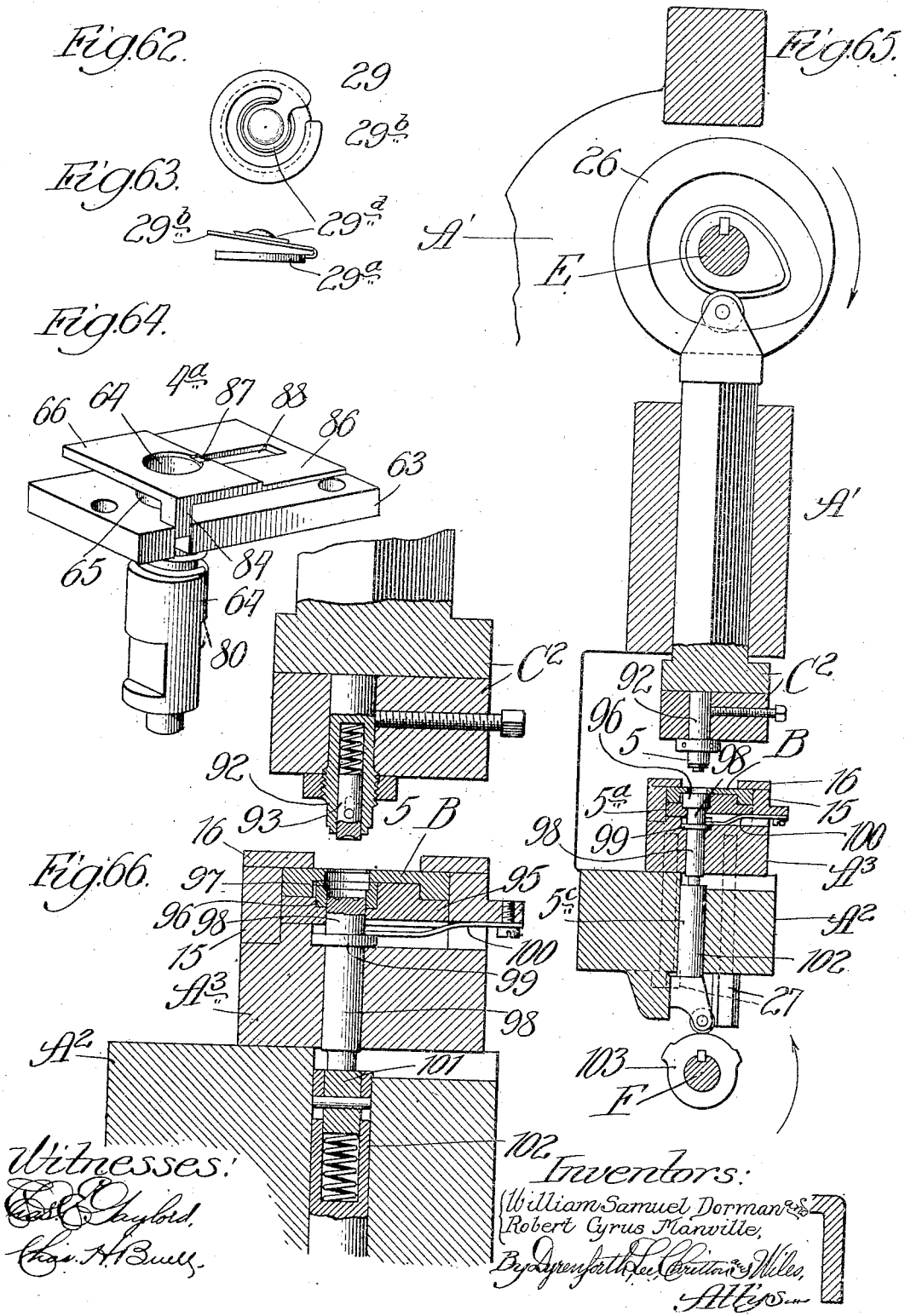

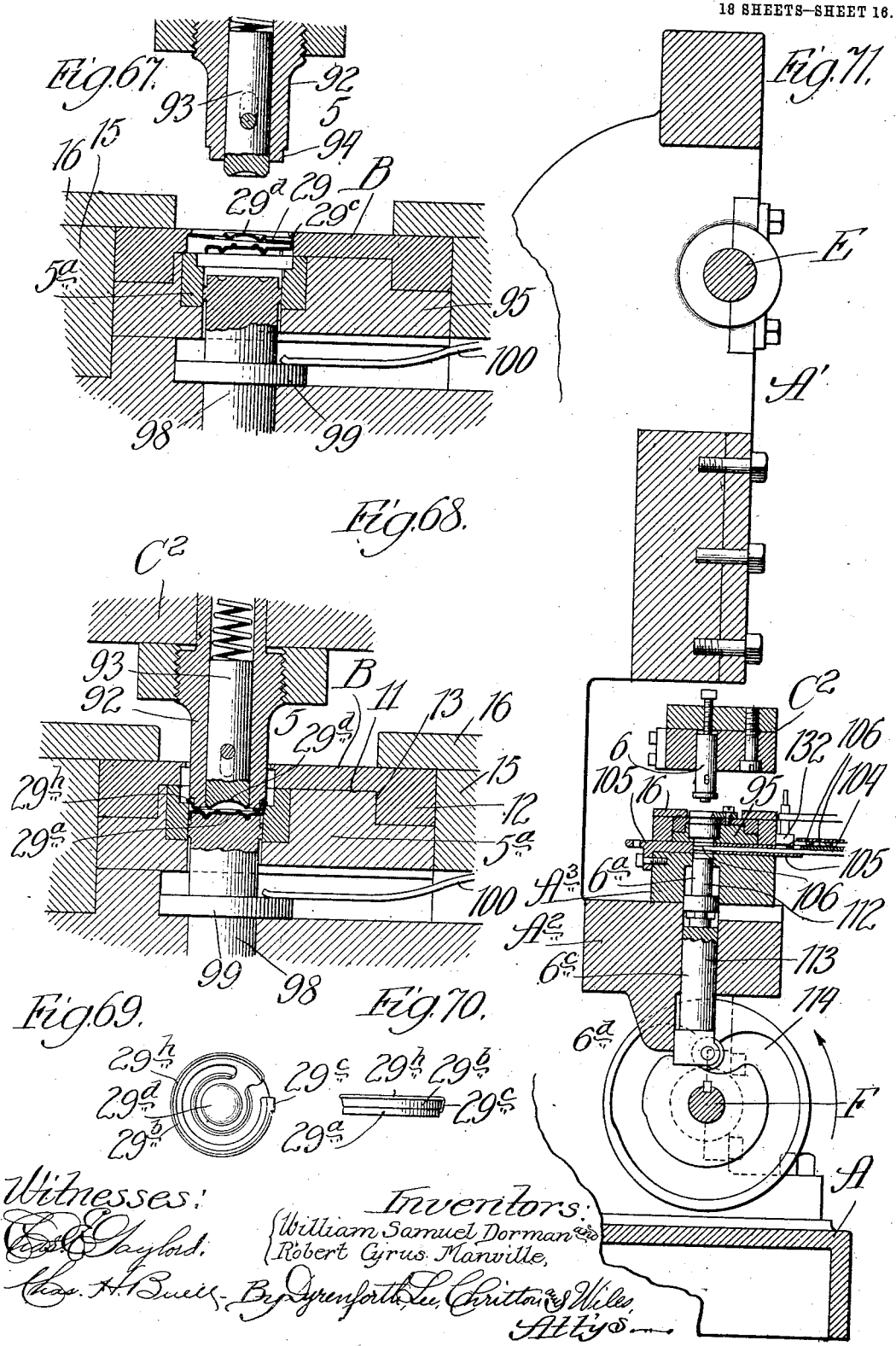

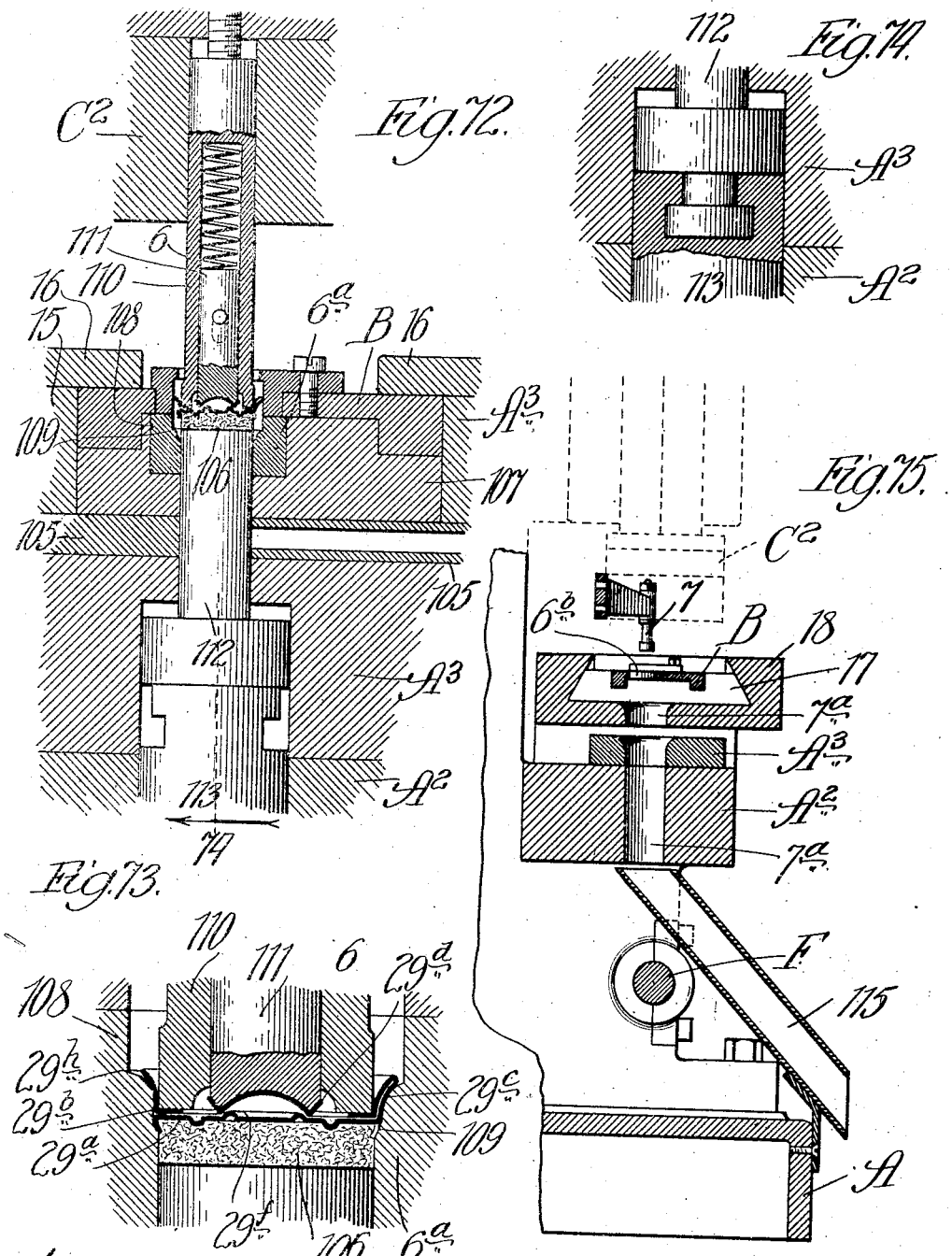

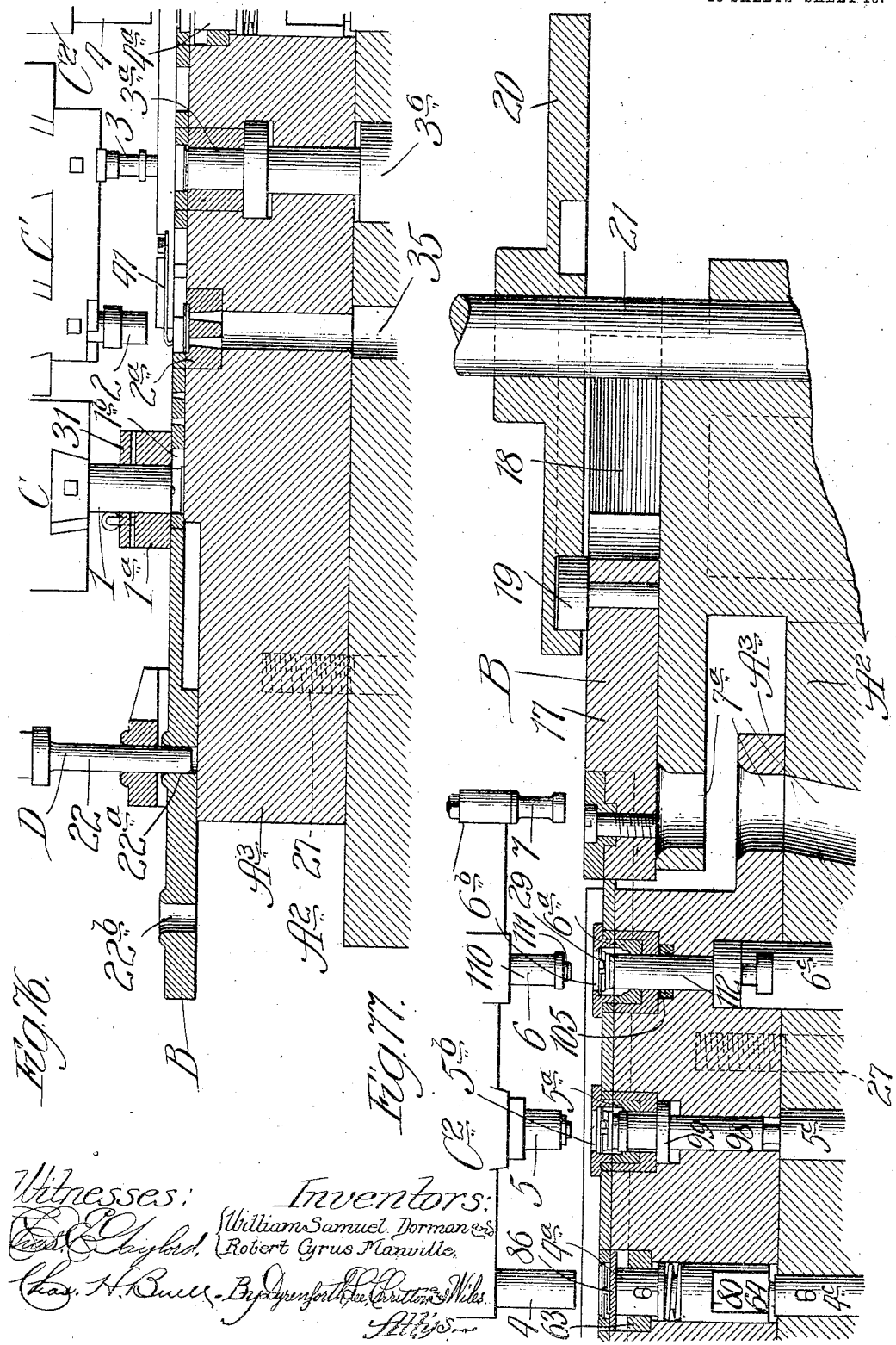

UNITED STATES PATENT OFFICE.

WILLIAM SAMUEL DORMAN, OF BROOKLYN, NEW YORK, AND ROBERT CYRUS MANVILLE, OF WATERBURY, CONNECTICUT, ASSIGNORS TO RICHARD A. CANFIELD, OF PROVIDENCE, RHODE ISLAND.

STOPPER-MAKING MACHINE.

1,039,661.  Specification of Letters Patent. Patented Sept. 24, 1912.

Application filed September 19, 1911. Serial No. 650,132.

*To all whom it may concern:*

Be it known that we, WILLIAM SAMUEL DORMAN and ROBERT CYRUS MANVILLE, citizens of the United States, residing, respectively, at Brooklyn, in the county of Kings and State of New York, and Waterbury, in the county of New Haven and State of Connecticut, have invented a new and useful Improvement in Stopper-Making Machines, of which the following is a specification.

This invention relates particularly to the manufacture of a bottle-stopper, or seal, comprising a metal cap carrying a sealing-disk (cork) and surmounted by a retainer-ring adapted to engage an internal annular ring-groove in the bottle-mouth, the retainer-ring having a centrally located tab, or finger-piece, which may be bent upwardly and used to dislodge the ring in unsealing the bottle.

The cap and locking-ring are formed from a double-disk blank (Figure 35), which is punched from a sheet-metal strip; one (the ring) disk is ring-pierced, as shown in Fig. 41; the cap-disk and the finger-piece (central tab) of the retainer-ring are then subjected to a cupping and beading operation, producing the form shown in Figs. 50 and 51; a folding operation then occurs (Fig. 60), producing the form shown in Figs. 62 and 63; the ring-disk is then subjected to a flanging operation (up-flanged) (Figs. 67 and 68), producing the form shown in Figs. 69 and 70; the cork-disk, or seal-disk, is then introduced (Fig. 72), and the downturned flange of the cap-disk is clenched thereon (Fig. 73); and, finally, the product is discharged from the machine in a manner which will be understood from Figs. 75 and 77.

The primary object is to provide a machine capable of economically producing, on a commercial scale, the bottle-seal, or stopper, referred to.

It may be stated preliminarily that the invention, in its preferred embodiment, comprises a fixed, bed-mounted die-plate, having therein dies adapted to receive the product in its various stages of formation; a horizontally-reciprocating carrier, or slide thereon having recesses into which the blanks are elevated from the lower dies at the various stages; and three vertically-reciprocating punch-equipped cross-heads, the first in order carrying the blanking-punch, the second carrying the ring-piercing punch and the cupping and beading punch (for cupping and beading the cap and for beading the tab of the retainer-ring), and the third carrying the blank-lowering punch (delivering to the folder), the ring-flanging punch, the cap-clenching punch, and the discharge punch.

The carrier-slide stops for an instant in its initial position (at the extreme left); also, in the second position (at the extreme right); and, also, in its third position (halfway position), on its return stroke. A cross-head not heretofore mentioned carries a locking-pin which co-acts with two perforations in the slide and locks it in its first (left) position and in its second (right) position. In the intermediate position, the actuating cam holds it stationary for an instant, during which time the second punch-carrying cross-head (third in time of action) acts to perform the cupping and beading operation mentioned. The cork-disks are contained in a hopper having a rotary bottom, which, by centrifugal action, delivers the cork-disks to a chute, from which they are depressed, one by one, into the path of a plunger which feeds them between the cork-inserting and clenching dies.

The invention is illustrated, in its preferred embodiment, in the accompanying drawings, in which—

Figure 59:
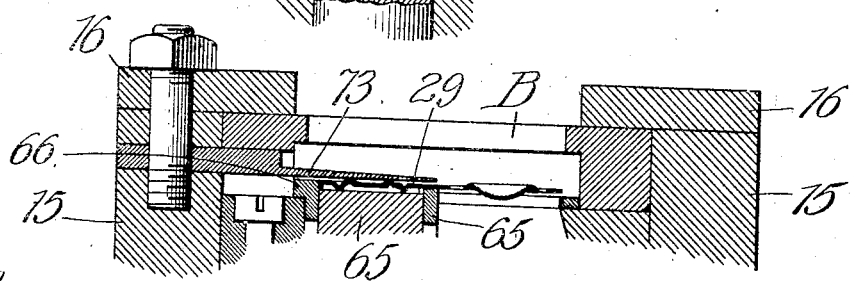

Fig. 1 represents a front elevation of the improved machine; Fig. 2, a left-side view with the drive-shaft in section, the view being taken as indicated at line 2 of Fig. 1; Fig. 3, a right-side elevation; Fig. 4, an enlarged plan section taken as indicated at line 4 of Fig. 1 and showing the upper cam-shaft; Fig. 5, a vertical section taken on line 5 of Fig. 4, and showing a detail of the clutch mechanism; Fig. 6, a plan section taken as indicated at line 6 of Fig. 5; Fig. 7, a section as indicated at line 7 of Fig. 5; Fig. 8, an inner face view of the hub of the gear-wheel which drives the upper cam-shaft and showing the clutch-recesses therein; Fig. 9, an outer face view of the collar fixed on the upper cam-shaft and in which is located a sliding key or clutch member; Fig. 10, a plan section taken as indicated at line 10 of Fig. 1, showing the guides for the upper cross-heads; Fig. 11, a section taken as indicated at line 11 of Figs. 1 and 3, showing the lower cam-shaft which serves to actuate the lower dies and blank lifters; Fig. 12, a section taken as indicated at line 12 of Fig. 11 and showing the cam which operates the cork-feeding slide; Fig. 13, a broken section taken as indicated at line 13 of Fig. 1 and showing the bed which carries the lower dies and the horizontally reciprocating carrier-slide mounted thereon; Fig. 14, a plan view of the carrier-slide; Figs. 15 and 16, sections taken as indicated at the corresponding lines on Fig. 14; Fig. 17, a section taken as indicated at line 17 of Figs. 3 and 18, being a section of the cork-feeding mechanism; Fig. 18, a left-side view of the cork-feeding mechanism; Fig. 19, a section taken as indicated at line 19 of Fig. 13, this view showing a section of the chute into which the corks are delivered by centrifugal action; Fig. 20, a section taken as indicated at line 20 of Fig. 19; Fig. 21, a section taken as indicated at line 21 of Fig. 19, showing the plunger which delivers the corks to the corking and clenching devices; Fig. 22, a section as indicated at line 22 of Fig. 13 and showing a cork-channel; Fig. 23, a broken view of the cork-hopper, showing the opening through which the corks are centrifugally discharged; Fig. 24, a plan view of the die-plate (for the lower dies) detached from the machine; Figs. 25, 26 and 27, plan views of the detached carrier-slide, showing respectively, the extreme left, the extreme right, and the intermediate positions; Fig. 28, a bottom view of the carrier-slide; Fig. 29, a plan section taken as indicated at line 29 of Fig. 1 showing the bed in plan and various plungers therein which serve to elevate the lower dies or blank-lifters, as the case may be; Fig. 30, an enlarged vertical section taken as indicated at line 30 of Fig. 1 showing the carrier-locking device, this view showing the members in different positions from those in which they are shown in the general views; Fig. 31, a section taken as indicated at line 31 of Figs. 1 and 11 and showing the blanking-dies, that is, the dies which punch the blanks from a strip of sheet metal; Fig. 32, a section taken as indicated at line 32 of Fig. 31; Fig. 33, an enlarged vertical section of the blanking-dies shown in Fig. 31, the section being parallel with the section in Fig. 31; Fig. 34, a plan view of the combined female die and stripper of the blanking-dies; Fig. 35, a view of the blank produced by the dies shown in Fig. 33; Fig. 36, a section taken as indicated at line 36 of Fig. 13 showing a detail of an automatically-actuated feed-stop serving to regulate the feed of the strip from which the blanks are punched; Fig. 37, a section taken as indicated at line 37 of Fig. 13 and showing a further detail of the feed-stop; Fig. 38, a section taken as indicated at 38 of Figs. 1 and 11, showing the ring-piercing dies; Fig. 39, an enlarged broken section of the ring-piercing dies shown in Fig. 38; Fig. 40, a plan view of the stripper for the piercing-die; Fig. 41, a view of the blank produced by the dies shown in Fig. 39; Fig. 42, a broken longitudinal section taken as indicated at line 42 of Fig. 39, this view showing a stationarily-mounted spring-finger which co-acts with the blank-lifter shown in Fig. 38; Fig. 43, a section taken as indicated at line 43 of Figs. 1 and 11, and showing the dies which serve to down-flange and bead the cap, and also to bead the tab of the retainer-ring; Fig. 44, an enlarged broken section parallel with the section shown in Fig. 43 and showing a detail of the dies shown in said figure; Fig. 45, a bottom view of the upper dies illustrated in Fig. 44; Fig. 46, a plan view of the lower dies shown in Fig. 44; Fig. 47, a plan view of said lower dies detached from the die-block or guide in which they reciprocate; Fig. 48, a perspective view of the stripper-ring, or blank-lifter, shown in Fig. 44; Fig. 49, a section taken as indicated at line 49 of Figs. 29 and 46; Fig. 50, a view of the form given the blank by the dies shown in Fig. 44; Fig. 51, a section taken as indicated at line 51 of Fig. 50; Fig. 52, an enlarged broken section of the dies shown in Fig. 44; Fig. 53, a fragmentary view of the carrier-slide; Figs. 54 and 55, broken sections taken as indicated at the corresponding lines of Fig. 53; Fig. 56, a section taken as indicated at line 56 of Figs. 1 and 11, and showing the blank-folding mechanism; Fig. 57, a section taken as indicated at line 57 of Fig. 56; Fig. 58, an enlarged broken section of the blank-folder; Fig. 59, a similar section showing the position after the pivoted anvil has moved to position over the cap-disk, preparatory to the folding operation; Fig. 60, a section similar to Fig. 58 illustrating the folding operation; Fig. 61, a section taken as indicated at line 61 of Fig. 60; Figs. 62 and 63, plan and elevational views, respectively, of the product after the folding operation; Fig. 64, a perspective view of part of the folder mechanism; Fig. 65, a section taken as indicated at line 65 of Figs. 1 and 11, and showing the ring-flanging dies; Fig. 66, an enlarged section of the dies shown in Fig. 65; Fig. 67, a similar section showing a blank in position for the ring-flanging operation; Fig. 68, a similar section showing the ring-flanging performed; Figs. 69 and 70, plan and elevational views of the product produced by the operation shown in Fig. 68; Fig. 71, a section taken as indicated at line 71 of Figs. 1 and 11 and showing the cork-introducing and clenching mechanism; Fig. 72, an enlarged broken section similar to the section shown in Fig. 71 and illustrating the position of the parts just prior to the clenching of the cap-flange upon the upper portion of the cork-disk of the bottle-seal; Fig. 73, a still further enlarged section showing the condition after the clenching operation; Fig. 74, a broken sectional detail view of a coupling employed for connecting the various plungers and lower dies or blank-lifters, as the case may be, the section being taken as indicated at line 74 of Fig. 72; Fig. 75, a section taken as indicated at line 75 of Fig. 1 and showing the stopper-discharge mechanism; and Figs. 76 and 77, complemental enlarged sectional views showing the relation of the upper and lower dies and the carrier-slide.

Described in detail, the preferred construction and operation are as follows:

The machine comprises a frame formed with a table A, housing A', bed $A^2$ spaced above the table, and lower die-plate $A^3$ detachably secured to said bed; a horizontally reciprocating carrier-slide B slidably mounted on the lower die-plate $A^3$; vertically-reciprocating, punch-equipped cross-heads C, C', $C^2$, which descend in the order C, $C^2$, C'; a bolt-carrying cross-head D, serving to lock the carrier in left and right positions; an upper cross-head actuating-shaft E; a lower die and blank-lifter actuating cam-shaft F; cork-feeding mechanism G; a feed-stop device H serving to limit the feeding movements of the hand-fed strip from which the blanks are punched; and clutch-equipped driving means I through which power is communicated to the shaft E.

The frame of the machine may be of any approved construction. The cross-heads C, C', $C^2$ have their shanks moving in guides in the top cross-member of the housing A', as will be understood from Figs. 1 and 10. The cross-head C is equipped with a blanking-punch 1 (Figs. 1 and 76); the cross-head C' is equipped with a ring-piercing punch 2 and upper cap-flanging and beading and tab-beading punches 3; the cross-head $C^2$ is equipped with a blank-lowering punch 4 (to lower the blank to the folder), a ring-flanging punch 5, a cap-clenching (cork-securing) punch 6, and a stopper-ejecting punch 7. The die-block, or die-plate, $A^3$ (Figs. 24, 76 and 77) is equipped with a female blanking-die $1^a$; a ring-piercing female die and blank-lifter $2^a$; a lower tab-beading and cap-flanging die and stripper $3^a$; a folder $4^a$ which operates to fold the locking-ring on the cap; a lower ring-flanging die $5^a$; a lower cork-elevating plunger and cap-clenching plunger $6^a$; and a stopper-discharge passage $7^a$.

The carrier B reciprocates on the elongated die-block $A^3$. It is provided, (Figs. 25-27) with a pocket, or perforation, $1^b$ which receives a blank from the blanking-dies and transfers to the ring-piercing dies; a perforation $2^b$ which receives the blank from the lower piercing-die and transfers to the beading and cap-flanging dies; a perforation $3^b$ which receives the blank from the lower beading and cap-flanging dies and transfers to the folder; a perforation $4^b$ which receives the folded blank and transfers to the ring-flanging dies; a perforation $5^b$ which receives the blank from the lower ring-flanging dies and transfers to the cork-securing dies; and a perforation $6^b$ which receives the blank from the lower cork-securing die and transfers to the discharge perforation $7^a$. The carrier-slide is further provided with a perforation 8 which is for use when the slide is at rest in its intermediate position, this perforation affording space for the folding operation. Also, the perforation $2^b$ is extended to the right, as indicated at 9, to afford space for the cap-flanging and beading operation which occurs when the slide is in its intermediate position. Also, the slide is equipped with a stripper 10 through which the ring-piercing punch operates when the slide is in its intermediate position, that is, halted on its return stroke.

The carrier-slide B is longitudinally recessed on its lower side (Figs. 28 and 39), as indicated at 11, so that the slide has its edge portions equipped with downturned flanges 12 which embrace a raised part 13 of the small transverse die-blocks, which, as shown in Fig. 24, are removably secured to the die-plate $A^3$, as by means of screws 14. As clearly appears from Fig. 39, the die-plate $A^3$ is provided at its edge portions with removably-secured upwardly-extended flanges 15 on which are secured inwardly-projecting flanges 16 which overlie the lateral margins of the carrier-slide. The carrier-slide has at one end a cross-head 17 (Figs. 14, 15 and 16) which moves in a dove-tail guide 18 with which the bed $A^2$ is equipped. The cross-head is equipped with a cam-roller 19 which engages a cam-groove in a disk, or wheel, 20 (Fig. 13) secured to a vertical shaft 21, which, as shown in Fig. 1, is actuated by the shaft E. The shaft 21 serves to actuate the lower cam-shaft F. The cross-head D carries a carrier-locking bolt 22 adapted to engage a perforation $22^a$ when the carrier is in its left-hand position, and adapted to engage a perforation $22^b$ in the carrier when it is in its right-hand position. Cams 23, 24, 25 and 26 serve, respectively, to operate the cross-heads D, C, C' and $C^2$. As indicated, the die-plate $A^3$ is removable from the bed $A^2$, being secured thereto (Fig. 29) by bolts 27. Through the bed $A^2$ operate various plungers which serve to actuate the lower dies, (where movable), folder and blank-lifters. A plunger corresponding with the blank-lifter $2^a$ is designated $2^c$ (Figs. 29, 76 and 77); a plunger corresponding with 3ª is designated 3ᶜ; plungers corresponding with the operative members of the folder 4ª are designated 4ᶜ; the plunger corresponding with the lower ring-flanging die 5ª is designated 5ᶜ; and the plunger corresponding with the cork-elevating member 6ª is designated 6ᶜ. Said plungers are actuated by cams on the shaft F (Figs. 1 and 11) designated respectively 2ᵈ, 3ᵈ, 4ᵈ, 5ᵈ and 6ᵈ.

The strip 28 (Figs. 13 and 24) from which the blanks 29 (Fig. 35) are punched by the dies 1 and 1ª is fed obliquely through a channel 30 (Figs. 31 and 34), which is formed between the female blanking-die 1ª and the surmounting stripper-plate 31. The female blanking-die is mounted on the die-plate A³ so as to extend transversely above the reciprocating carrier B. Thus, the blanks will fall into the opening 1ᵇ of the carrier when the carrier is in its left-hand position. A rest, or guide-member, 32 (Figs. 13 and 39) is provided in alinement with the slot 30. The blanking-punch 1 is equipped with spring-held leaders, 33 adapted to force the blank downwardly through the female blanking-die after the severing operation.

The blank 29 comprises a cap-disk 29ª, a ring-disk 29ᵇ, and a connecting web 29ᶜ (Fig. 35). After the disk 29ᵇ has been ring-pierced, it has a central tab 29ᵈ. After subjection to the cap-flanging and beading operation, the cap has (Figs. 50 and 51) a downturned flange 29ᵉ, and a raised annular centering head 29ᵇ; and the tab 29ᵈ is beaded and cupped, as indicated at 29ᵍ, so as to be centered upon the centering-bead 27 of the cap after the product has been folded to the form shown in Figs. 62 and 63. It may be noted here that in the folding operation the web or neck 29ᶜ of the blank is so folded or bent that the locking-ring will lie flat on the top of the cap. After the ring-flanging operation shown in Fig. 68, the locking-ring has an upturned flange 29ʰ (Fig. 73) which is adapted to engage an internal groove in the mouth of the bottle.

The ring-piercing dies will be understood from Figs. 38, 39, 40, 76 and 77. The punch 2 is rigidly carried by the cross-head C′, and is shaped to punch a strip of metal substantially in the form of a ring-segment from the disk 29ᵇ. The lower die 2ª has a crescent-shaped opening 34 to receive the punch, and the stripper 10 has a similar perforation 34. Beneath the die 2ª is a passage-chute 35 for the waste material punched from the disk 29ᵇ. The female piercing-die 2ª is in the form of a short block removably mounted crosswise on the die-plate A³ (Fig. 24). It is provided in its upper surface with a shallow recess 36 which corresponds with and is adapted to receive the blank. Beneath the space which receives the cap-disk 29ª is a blank-lifting plunger 37 which works through a vertical perforation in the die-plate A³. The member 37 is provided with a reduced lower end (Fig. 39) which is equipped with a collar 38 adapted to co-act with a stop 39 carried by the die-plate and adapted to limit the upward movement of the plunger. The plunger 2ᶜ (Figs. 29 and 39) works through the bed A² and has its upper end equipped with a spring-pressed follower 40 adapted to engage the lower end of the plunger 37, said follower 40 being capable of limited movement with relation to the plunger 2ᶜ. The plunger 2ᶜ is properly guided near its lower end (Fig. 38) and is actuated by the cam 2ᵈ. Co-acting with the blank-lifter 37 is a spring 41 which is mounted on the rear flange-member 16 of the die-plate A³ (Figs. 13, 39 and 42). Said spring 41 has a curved finger or nose 42 adapted to depress the blank from the recess 1ᵇ of the carrier to the recess 36 of the die 2ª. The spring 41 also co-acts with the blank-lifter 37 when the blank is elevated into the recess or pocket 2ᵇ of the carrier. When the carrier moves, the spring rides over it from one pocket to the other, beveled surfaces or recesses 43 (Fig. 42) being provided to facilitate this action.

The cap-flanging and beading and tab-beading dies will be best understood from Fig. 29, Figs. 43 to 52 inclusive, and Fig. 76. The upper punch 3 comprises a cap-flanging punch 44 fitted with a spring-pressed cap-beading plunger 45 capable of limited movement with relation to the member 44; and a fixedly secured shank 46 on which is mounted a spring-pressed tab-beading plunger 47 capable of limited movement with relation to the member 46. The lower dies 3ª comprise a short block 48 which is detachably secured to the die-plate A³; a member 49 having a flange 50 surmounted by a suitably matrixed cap-flanging and beading die 51 and tab-beading die 52. The die 51 is encircled by a nearly tubular, or crescent-shaped, stripper 53 which has a flange 54 capable of limited movement in a suitable recess on the under side of the block 48. The stripper-sleeve 53 encircles the lower die 51 and is adapted to recede when the annular portion of the punch 45 operates to bend the flange of the cap downwardly, as shown in Fig. 52. The member 49 has its flange 50 working in a recess 55 in the die-plate A³ (Fig. 44) so that the member 49 is capable of limited movement. Said member 49 has a depending stem 56 working through the die-block A³ and adapted to be engaged by a spring-pressed follower 57 mounted in the upper end of the cam-actuated plunger 3ᶜ; said follower 57 being capable of limited movement with relation to the member 3ᶜ. As shown in Fig. 43, the lower end of the member 3ᶜ is suitably guided while it is engaged by the cam 3ᵈ. The stripper-sleeve 53, which is recessed to accommodate the web of the twin-die 49 which corresponds with the web of the blank, is equipped with depending pins 58 which work through openings in the die-plate A³ and engage spring-pressed followers 59 in the member 3ᶜ (Fig. 49). Thus, when the member 3ᶜ is raised by the cam 3ᵈ, the stripper, as well as the twin-die 49, will be lifted, the stripper being projected by the spring-pressed followers 59, within the limit of movement permitted. The blank is received from the piercing-dies by the pocket 2ᵇ of the carrier when the carrier is in the position shown in Fig. 25.

When the carrier is in the position shown in Fig. 26, that is, at the extreme right, the pocket 2ᵇ is over the die 3ª (more specifically the twin-die 49). While the carrier is in this position, the punches 3 descend sufficiently to enable the members 45 and 47 of the upper punches to press upon the blank, the blank being at this time held between the upper dies 3 and lower dies 3ª. This continues until the carrier moves back halfway, the enlargement 9 of the pocket 2ᵇ permitting, and when the carrier stops in its intermediate position the cross-head C' completes its downward movement, thereby causing the punch 2 to perform the piercing operation, while the punches 3 perform the cap-flanging and beading and the tab-beading operation. The cross-head C' then rises and the carrier continues its movement to the left. It may be further explained, with reference to Figs. 53, 54 and 55, that the pocket 2ᵇ of the carrier-slide has a finger 60 which is under-slotted at 61 to accommodate the web of the blank. The carrier also has a wall 62 adapted to overhang the cap-blank, said wall being recessed to accommodate the blank. When the punches 3 descend, they lower the blank with reference to the recess noted, so that the slide can move to the left, leaving the blank in the lower dies 3ª. The cam 25 is suitably shaped to give to the cross-head C' the double-step movement of descent referred to, so that the piercing and cap-flanging and beading operations will occur when the slide is at rest after the halfway return movement.

The folder mechanism 4ª to which the blank is transferred from the cap-flanging and beading and tab-beading dies through the medium of the pocket 3ᵇ of the carrier and into which the blank is lowered by the punch 4, will be understood by reference to Fig. 56, Figs. 58–64, and 77. Said folder mechanism 4ª comprises a block 63 secured to the die-block A³ (Figs. 61 and 64); a plunger 64 whose upper end is slidably mounted in a sleeve 65 carrying a plate or support 66, the sleeve 65 being provided with slots which engage a transverse pin 67 carried by the reduced upper end of the plunger 64; a stop 68 engaging a slot with which the plunger 64 is provided and serving to limit the movement of said plunger; a spring 69 confined between the sleeve 65 and the enlarged portion of the plunger 64; a cam-actuated plunger 70 forming a part of the actuating means 4ᶜ and having its upper end tubular and equipped with a spring-pressed follower 71 on which rests the reduced lower end of the plunger 64, the follower 71 being capable of limited movement with relation to the plunger 70; a cam 72 serving to intermittently operate plunger 70; a horizontally-swinging anvil 73 connected by a vertical pivot 74 with the rear guide-flange 15 of the die-plate A³, said anvil having a spring-held arm 75; a plunger 76 located adjacent to and extending parallel with the plunger 64 and equipped with a folder-finger 77 which is connected with the plunger by a pivot 78 and has a short arm or knee 79 adapted to engage a shoulder 80 with which the plunger 64 is equipped; and a plunger 81 having its upper end disconnectibly joined to the lower end of the plunger 76, the plunger 81 being actuated by a cam-rod 82 which, in turn, is actuated by a cam 83.

The plate 66 is equipped at one of its rear corners with a post 84 which moves in a slot with which the block 63 is provided (Fig. 64). The rear flange 12 of carrier B is provided with a slot 85 into which the anvil 73 may swing when the carrier is in the proper position. The plate 66 is normally elevated with reference to the block 63 when the blank is received thereon, so that the anvil 73 will strike against the post 84. At the proper time, the cam 72 will permit the plate 66 to drop, whereupon the spring connected with the arm 75 will turn the anvil to the position shown in Figs. 59 and 61, that is, to a position over the plate 66 and above the cap portion of the blank 29. The plate 66 has a flat upper face, and has the front half of its upper surface cut away or recessed, as indicated at 86, the depressed surface 86 being flush with the upper end of the plunger 64 in the position of the parts shown in Fig. 64, in which position the upper end of the bore of the sleeve 65 is presented above the upper end of the plunger 64 to provide a socket for the cap portion of the blank. The raised portion of the plate 66 is provided with a small recess 87 adapted to receive the web of the blank. The reduced portion of the plate 66 is provided with a slot 88 through which the folder-finger 77 is adapted to pass in the folding operation. The member 77 is of substantially bell-crank form, having its upwardly extending long arm provided with a nose-piece or lateral projection 89 whose extremity normally bears against the sleeve 65, as shown in Fig. 58.

It may now be explained that the blank is deposited on the plate 66 with the cap portion in the socket at the upper end of the sleeve 65 and the web extending through the slot 87, the ring portion of the blank lying on the reduced or depressed surface 86, the blank being deposited while the plate 66 is in the position shown in Fig. 64. When the plunger 64 is lowered, the plate drops with it, and the anvil 73 swings to the operative position above the blank, as shown in Fig. 59, after which the plunger 76 is actuated through the medium of the cam 83 (Fig. 56), thereby effecting the folding operation shown in Fig. 60. In the first portion of the upward movement of the plunger 76, the nose portion 89 of the folder-finger 77, by vertical movement, bends the web of the blank up; and after the nose passes the anvil, the arm 79 engages the shoulder 80, causing the rocking action of the member 77, in which movement the locking-ring is bent to a position nearly parallel with the cap-disk. In Fig. 60, the locking-ring is shown diverging somewhat from the cap portion of the blank, as is also the case in Fig. 63, where the divergence is shown exaggeratedly.

From Figs. 56 and 57, it will be observed that the cam-arm 82 has an adjustable pivot 90 carried by the bracket depending from the bed $A^2$; also that the plunger has a squared surface 91 at its lower end portion which engages a squared surface or guide of the bed $A^2$, so that the plunger will be prevented from turning. This expedient is employed in various places in the machine. It may be added that the cam 83 is timed to effect the folding of the blank when the carrier is at rest at the midway point of its return movement, in which position the pocket 8 of the carrier will afford space for the locking-ring to be swung upwardly and then rearwardly to the horizontal position.

After the folding operation, the carrier continues its movement to the left, and the folded blank is then elevated to the pocket $4^b$ of the carrier, by which it is carried to the ring-flanging dies. The ring-flanging dies will be understood from Figs. 65–68, and 77. The upper punch 5 comprises a tubular member 92 which is fixedly secured to the cross-head $C^2$ and fitted with a spring-projected centering member 93, which is concaved at its lower end to engage the beaded portion of the tab in the locking-die. The member 92 has a reduced lower end 94 adapted to enter the cup-shaped lower die $5^a$ and perform the flanging operation.

The lower die $5^a$ comprises a block 95 carried by the die-plate $A^3$ and equipped with an annular die 96 having a matrix 97 adapted to receive the reduced end of the punch member 92. Through the die 96 works a blank-lifter 98 in the form of a plunger having a collar 99 engaged by a spring 100. The lower end of the plunger is reduced and bears on a spring-pressed follower 101 in the upper end of a plunger 102 forming a part of the blank-lifter actuating means $5^c$. The plunger 102 is equipped at its lower end with a cam-roller which engages a cam 103 on the cam-shaft F.

The ring-flanging operation occurs when the carrier is located in its right-hand position. After the return of the carrier, the blank is elevated and received by the pocket $5^b$, by which it is transferred to the cork-introducing and securing mechanism. The corking mechanism will be understood by reference to Figs. 13, 21, 71–73 and 77. The corks are delivered by the mechanism G in the path of the horizontally reciprocating plunger 104 which works in the chute or short passage 105 extending into the die-plate $A^3$. The inner end of the plunger 104 is recessed in the form of a half-circle and is adapted to press the cork 106 against a complemental half-circle at the rear end of the chute 105, as shown in Figs. 21 and 71. A block 107 mounted on the die-plate $A^3$ is fitted with an annular die 108 having a tapering surface 109 adapted to clench the cap-flange upon the cork. The upper punch 6 comprises a tubular member 110 in which is located a spring-projected centering member 111. Working through the die 108 is a cork-elevating plunger 112 whose lower end is detachably connected with the upper end of a plunger 113 working through the bed $A^2$ and constituting a part of the actuating means $6^c$. The lower end of the plunger 113 is equipped with a cam-roller which engages a cam 114 on the shaft F. The cork-disk 106 is fed into the path of the plunger 112 while the plunger is in the lowered position, as shown in Fig. 71. The plunger 112 then rises and elevates the cork to approximately the position shown in Fig. 73, the upper punch 6 descending at the same time. The cam 114 is relieved somewhat to allow the stripper with the cork inserted in the flange of the cap to be lowered while the punch member 110 operates to force the flange of the cap into the downwardly contracting matrix 109 of the die 108, thereby performing the clenching operation shown in Fig. 73. This operation is performed while the carrier-slide is in its right-hand position. When the carrier-slide moves again to its left-hand position, the plunger 112 rises still farther to deliver the stopper to the pocket $6^b$ of the carrier, by which it is transferred to the stopper-discharging position. Fig. 72 shows the stopper.

The stopper-discharging means comprises simply the punch 7 carried by the crosshead C², which punches the stopper from the pocket 6ᵇ of the carrier at the instant when said pocket is over the discharge-passage 7ᵃ of the die-plate A³, and the stoppers pass through a chute 115 (Fig. 75) into a receptacle.

The cork feeding mechanism G will be understood from Figs. 13 and 17 to 20 inclusive. The corks are placed in bulk in a hopper 116 having a stationary bottom 117 supported by a bracket 118. Above the stationary bottom is located a disk 119 mounted on a vertical shaft 120 operated by a pulley 121 joined by a belt 122 (Fig. 1), to a pulley 123 on the lower end portion of the vertical shaft 21. The disk 119 rotates in the direction indicated by the arrow in Fig. 13 and serves, by centrifugal action, to force the cork-disks through a curved channel 124 formed between a portion of the circumferential wall of the hopper and a wall 125 which, for the most part, extends parallel with the circumferential wall of the hopper, but intersects the circumferential wall at 126. Near this point of intersection, the wall 125 is provided with an opening 127 through which the corks may enter the cork-channel 124. Where the circumferential wall of the hopper bounds the channel 124, said wall is cut away at its upper portion, leaving merely a flange forming the outer wall of the cork-channel. Above the path of the corks is a plate, or ring-segment, 128 forming the top wall of the channel. This ring-segment is supported by brackets 129 (Fig. 13) which also serve to support the wall 125. The curved channel 124 communicates with the rearwardly-extending straight channel 130 (Fig. 19) which terminates above the outer end of the feed-chute 105. Here the bottom wall of the chute 130 is provided with a perforation 131 through which the corks may pass to the chute 105. A plunger 132 serves to positively force the corks from the inner end of the chute 130 and deposit them in the outer end of the chute 105 when the plunger 104 is at the outer end of its stroke. The plunger 104 is equipped with an arm 133 carried by a slide 134 which is actuated by an arm 135 mounted on a rock-shaft 136 (Fig. 17) which is equipped at its opposite end with an arm 137 actuated by a cam-link 138 (Fig. 12) engaged by a cam 139 mounted on the cam-shaft F. The cam 139 actuates the link 138 in one direction, and a spring 140 actuates it in the other direction, maintaining it in contact with the cam. The member 133 which actuates the cork-delivering plunger 104 carries a cam 141 which engages a pivot-arm 142 which carries the plunger 132. When the slide 134 is retracted through the medium of the arm 135, the cam 141 passes beneath the high portion 143 of the arm 142, thereby permitting the plunger 132 to drop and force a cork-disk downwardly to the chute 105, as will be understood from Fig. 19. The arm 142 is equipped with a weight 144.

The mechanism H for regulating the feed of the metal strip 28 will be understood from Figs. 2, 13, 36 and 37. It comprises a stop-finger 145 adapted to work through an opening 146 in the stripper 31 (Fig. 34), said finger 145 being mounted on a rock-shaft 147 which is equipped at its rear, or right-hand end with a loosely mounted disk 148. The disk 148 carries a stud 149 (Fig. 37) adapted to engage the cross-pin 150 with which the rock-shaft 147 is equipped. A spring 151 connected with said stud serves to yieldingly maintain the disk 148 in the position shown in Fig. 37. The rock-shaft 147 is equipped with an actuating arm 152, from which depends a rod 153 whose lower end is engaged by a cam-arm 154 (Fig. 31) whose front end is supported by a pivot 155 carried by the bed A². The arm 154 is lifted at intervals by a cam 156 mounted on the shaft F. Thus, the stop-finger 145 will be lifted for an instant at each revolution of the shaft F, enabling the strip of material 28 to be advanced. The stop-finger will then fall back to its normal position and will engage the perforation in the strip from which the blank has been punched, leaving the strip in position for the punching of a fresh blank.

The driving and clutch mechanism for the machine will be understood by reference to Figs. 1 and 4 to 9 inclusive. A gear 157 is journaled on one end of the shaft E and is rotated continuously through the medium of a pinion 158 mounted on a shaft 159 equipped with a pulley 160, which may be connected with the countershafting of a building. The inner face of the hub of the gear 158 is equipped with slots 161 adapted to be engaged by a dog or clutch-member 162 which is slidably mounted in a sleeve 163 which, as shown in Fig. 9, is secured to the shaft E. The dog or clutch-member 162 is spring-pressed, as shown in Fig. 5, being adapted to be projected into engagement with one of the slots 161 in the hub of the gear 157. The dog 162 is provided with a slot 164 affording a shoulder or head 165, the inner wall of which is adapted to be engaged by the chisel-edge-end of a retracting pawl 166 which is supported on a pivot 167. A spring 168 tends to throw the clutch-retracting pawl 166 into the operative position. The pawl 166 may be withdrawn from engagement with the clutch-member through the medium of a foot-lever 169 connected with a rock-shaft 169ᵃ, said rock-shaft being connected by a rod 170 to a lever 171 which is joined by a link 172 to the pawl 166.

From the foregoing, it will be understood that the machine operates while the foot-lever 169 is depressed, and is automatically thrown out of operation when the foot-lever is allowed to rise.

The improved machine operates to produce complete bottle-stoppers or bottle seals of the character shown in Fig. 73, thus serving as a labor-saving device of great practical importance.

The foregoing detailed description has been given for clearness of understanding only, and no undue limitation should be understood therefrom, but the appended claims should be construed as broadly as permissible in view of the prior art.

What we regard as new and desire to secure by Letters Patent is—

1. In a stopper-making machine, the combination of blank-punching means adapted to produce a pair of web-connected disks, means for down-flanging one disk to afford a cap, means for ring-piercing the other disk to produce an expansible retainer-ring, and means for surmounting said retainer-ring snugly upon said cap.

2. In a stopper-making machine, the combination of means for punching and forming a cap and expansible retainer-ring, including means for down-flanging said cap, and coöperating means for surmounting said retainer-ring snugly upon said cap.

3. In a stopper-making machine, the combination of means for punching a blank comprising a pair of disks and a connecting web, means for flanging one disk to produce a cap, means for perforating the other disk to produce a retainer-ring, means for folding the retainer-ring, while flat, upon the top of the cap, and means for flanging the retainer-ring after such folding operation.

4. In a stopper-making machine, the combination of means for punching and forming a cap and retainer-ring, coöperating means for folding the retainer-ring on the cap, and means for introducing a sealing-disk in said cap.

5. In a stopper-making machine, the combination of means for punching and forming a cap and retainer-ring, including means for flanging said cap, coöperating means for folding the retainer-ring on the cap after the cap-flanging operation, means for introducing a sealing-disk in said cap, and means for clenching the cap-flange on the sealing-disk.

6. In a stopper-making machine, the combination of means for producing a double-disk blank, means for ring-piercing one disk and down-flanging the other disk, a reciprocatory carrier operative to advance the blanks in a step-by-step movement, a folder located beneath said carrier and operative to fold the ring disk on the other disk, said carrier having an opening to permit the operation of the folder, means for intermittently feeding a cork-disk beneath the carrier, a cork-elevating plunger, and means for clenching the cap on the cork disk.

7. In a machine of the character set forth, the combination of a bed equipped with a series of lower dies and with a folder, a reciprocatory carrier mounted on said bed and operative to advance the blanks step-by-step, said carrier having an opening through which the folder may operate, and a series of cross-heads located above said bed and equipped with upper dies co-acting with said lower dies, one of said cross-heads carrying also a punch adapted to lower the blanks to the folder.

8. In a machine of the character set forth, the combination of a bed equipped with a series of lower dies and blank-lifters, a reciprocating carrier on said bed having a plurality of openings adapted to receive the blanks at the various stages of formation, a cross-head equipped with a blanking-punch, a second cross-head equipped with a ring-piercing punch and with cap-flanging and beading and tab-beading punches, and a third cross-head equipped with a blank-lowering punch, a ring-flanging punch and a cap-clenching punch, said carrier operative to advance the blanks intermittently and having a full movement of reciprocation in one direction and a double-step return movement, said second-named cross-head making its final downward movement at the end of the first step of the return movement of the carrier.

9. In a machine of the character set forth, the combination of a bed equipped with a plurality of dies and blank-lifters and equipped also with a folder, said dies including a ring-piercing die, a reciprocatory carrier mounted on said bed and provided with a plurality of openings adapted to receive the blanks in their various stages of formation, said carrier equipped also with a stripper co-acting with the ring-piercing dies and with an opening permitting operation of the folder when the carrier is in the intermediate position, and a series of punches located above said carrier and co-acting with the lower dies and carrier.

10. In a machine of the character set forth, the combination of a bed equipped with a plurality of lower dies and blank-lifters and equipped also with a folder, a reciprocatory carrier mounted on said bed and provided with a series of equal-spaced transfer pockets, one of said pockets having an extension at one side thereof, said carrier equipped between two of said pockets with a stripper and provided between two others of said pockets with a turn-over space, means for imparting a full stroke to said carrier in one direction, means for imparting a double stroke in the return movement of said carrier, a cross-head carrying a blanking-punch and operating when the carrier is at one end of its movement, a cross-head carrying a blank-lowering punch, a ring-flanging punch and a cap-clenching punch, said second-named cross-head operating when the carrier is at the other end of its traverse, an intermediate cross-head equipped with a ring-piercing punch and equipped also with a cap-flanging and beading punch and with a tab-beading punch, said last-named cross-head operative when the carrier is in its intermediate position, and means for operating the folder when the carrier is in its intermediate position.

11. In a machine of the character set forth, the combination of a bed, a reciprocatory carrier provided with transverse transfer-pockets, a female blanking-die mounted on said bed above said carrier and adapted to produce a double-disk blank, a cross-head equipped with a coöperating blanking-punch, a lower piercing-die beneath said carrier, lower cap-flanging and beading and tab-beading dies mounted in said bed beneath said carrier, and a cross-head above said carrier equipped with a ring-piercing punch and equipped also with cap-flanging and beading and tab-beading punches.

12. In a machine of the character set forth, the combination of a bed, a reciprocatory carrier mounted thereon, a folder mounted on said bed, dies in advance of said folder serving to blank-punch, ring-pierce and cap-flange a double-disk blank, said folder operative to fold said blank after it has been operated on by said dies, and means in the rear of said folder operative to ring-flange and cork-equip the folded blanks, said carrier having therein pockets adapted to receive the blanks in their various stages of formation.

13. In a machine of the character set forth, the combination of a bed, a reciprocatory carrier, a female blanking-die mounted on said bed above said carrier, a reciprocating blanking-punch above the same, a ring-piercing die mounted in said bed beneath said carrier, a ring-piercing punch co-acting therewith, a lower cap-flanging die, an upper cap-flanging die, pockets in said carrier adapted to receive the blanks, a blank-lifting plunger adjacent the lower ring-piercing die, and a spring mounted on the bed and co-acting with the upper end of said plunger, said carrier operative to advance the blanks intermittently and permitting the spring to ride upon it, as set forth.

14. In a machine of the character set forth, the combination of a bed, means for producing a double-disk blank, means for ring-piercing one disk of the blank, a reciprocating carrier operative to advance the blanks intermittently, a reciprocating upper cap-flanging die, a vertically-reciprocable cap-flanging die mounted in said bed, a stripper associated with the lower cap-flanging die, and a cam co-acting with the lower cap-flanging die.

15. In a machine of the character set forth, the combination of a bed, means for producing a double-disk blank, means for ring-piercing one disk of the blank, a reciprocating carrier operative to advance the blanks intermittently, a reciprocating upper cap-flanging die, a vertically-reciprocable cap-flanging die mounted in said bed, a stripper associated with the lower cap-flanging die, a cam co-acting with the lower cap-flanging die, and a folder adapted to fold the retainer-ring on the top of said cap.

16. In a machine of the character set forth, the combination of a bed, means for producing a double-disk blank, means for ring-piercing one disk of the blank, a reciprocating carrier operative to advance the blanks intermittently, a reciprocating upper cap-flanging die, a vertically-reciprocable cap-flanging die mounted in said bed, a cam coöperating with the lower cap-flanging die, a folder adapted to fold the retainer-ring on the top of said cap, a lower ring-flanging die mounted in said bed, a blank-lifter co-acting with the same, and an upper reciprocating ring-flanging die.

17. In a machine of the character set forth, the combination of a bed, means for producing a double-disk blank, means for ring-piercing one disk of the blank, a reciprocating carrier operative to advance the blanks intermittently, a reciprocating upper cap-flanging die, a vertically-reciprocable cap-flanging die mounted in said bed, a cam coöperating with the lower cap-flanging die, a folder adapted to fold the retainer-ring on the top of said cap, a lower ring-flanging die mounted in said bed, a blank-lifter co-acting with the same, an upper reciprocating ring-flanging die, a horizontally-reciprocating cork-feeding plunger operative through said bed, a vertically-reciprocating cork-lifting plunger, a lower clenching-die associated therewith, and a co-acting upper clenching-die.

18. In a machine of the character set forth, the combination of means for producing a down-flanged cap and a surmounting up-flanged retainer-ring of cork-insertion means comprising a cork-feeding plunger, a vertically-reciprocating cork-lifter, a lower clenching-die associated therewith, and a co-acting upper clenching-die.

19. In a machine of the character set forth, the combination with means for producing a down-flanged cap and a surmounting up-flanged retainer-ring, including a reciprocatory carrier, of a cross-head carrying a clenching punch and a discharge punch, a lower clenching-die beneath said carrier, and a stopper-lifter associated therewith, said carrier operative to advance the product intermittently.

20. In a stopper-making machine of the character set forth, the combination of a frame equipped with a bed and beneath said bed with a shaft carrying a series of cams, plungers working through said bed and actuated by said cams, a die-plate removably mounted on said bed and equipped with a series of lower dies and blank-lifters co-acting with said plungers, a carrier reciprocating on said die-plate and provided with a series of transverse pockets adapted to receive the blanks in their various stages of formation, vertically-reciprocating punches above said carrier co-acting with the lower dies and blank-lifters, and a folder mounted in said die-plate and co-acting with said carrier.

21. In a stopper-making machine, the combination with means for producing a double-disk blank, and a carrier operative to advance the blanks, of a folder comprising an anvil adapted to swing over one disk of the blank, and means operating through an opening in the carrier to fold the other disk over said anvil.

22. In a stopper-making machine, the combination with means for producing a double-disk blank, and a carrier operative to advance the blanks, of a folder comprising an anvil adapted to move to a position above one disk of the blank, and a folder finger mounted beneath the carrier and moving vertically through an opening in the carrier and then laterally to fold the other disk over said anvil.

23. In a stopper-making machine, the combination with means for producing a double-disk blank, of a folder comprisng a vertically movable plunger having a blank-socket and adapted to support a double-disk blank, an anvil adapted to move to a position above one disk of the blank, a second plunger, and a rock-member mounted thereon and adapted to fold the other disk over said anvil.

24. In a machine of the character set forth, a folder comprising a vertically-movable plunger, a sleeve-carried plate mounted thereon and provided with a blank-socket, a co-acting anvil movable to a position over one disk of a blank carried by said plate, a vertically-movable plunger, and a bell-crank folder mounted on said second-named plunger and co-acting with said anvil, in combination with a blank-lowering punch.

25. In a machine of the character set forth, the combination of a bed, a series of lower dies and blank-lifters mounted thereon, a carrier on said bed provided with a blank-pocket, crossheads equipped with punches co-acting with said dies and blank-lifters, and a folder mounted on said bed beneath said carrier and comprising a vertically-movable blank-supporting member, an anvil movable to a position above one portion of a double-disk blank carried by said member, a vertically reciprocating plunger, and a bell-crank folder-finger mounted on said plunger and adapted to be projected through an opening in the blank-supporting member and into said blank-pocket, said carrier having blank-transferring pockets and operative to advance the blanks step-by-step.

26. In a machine of the character set forth, a folder comprising a block, a vertically movable plunger, a blank-supporting plate above said block equipped with a sleeve encircling the upper portion of said plunger, said plate having one portion of its upper surface recessed and having also a slot, a second plunger, a pivotally mounted anvil adapted to swing in a horizontal plane to a position above said blank-supporting plate, and a bell-crank folder-finger mounted on said second-named plunger and co-acting with said anvil.

27. In a machine of the character set forth, the combination of a bed, a series of lower dies and blank-lifters mounted thereon, a reciprocatory carrier, a female blanking-die mounted above said carrier adapted to form a double-disk blank and equipped with a stripper, with a feed-channel between said stripper and die which extends obliquely over the path of said reciprocatory carrier, wherethrough a strip of sheet metal may be fed, a blanking-punch co-acting with said blanking-die, and a series of upper punches co-acting with said lower dies.

28. In a machine of the character set forth, the combination of a bed equipped with a lower ring-piercing die, a lower cap-flanging die, a folder, and a lower clenching-die, blanking-dies in advance of the ring-piercing die, a cross-head equipped with a ring-piercing punch and with a cap-flanging punch, another cross-head equipped with a blank-lowering punch co-acting with the folder and equipped also with a clenching-punch, means for giving to the first-named cross-head a double-step downward stroke, and a carrier slidably mounted on said bed and provided with blank-receiving pockets, the pocket which transfers to the cap-flanging die being elongated to permit the dies to hold the blank during a part of the return movement of the carrier, and means for imparting a double-step return movement to the carrier.

29. In a machine of the character set forth, the combination with means for holding a flanged cup and means for clenching the flange, of means for feeding a sealing-disk comprising a feed-channel, and a device acting by centrifugal action to deliver the disks to said channel.

30. In a machine for the purpose set forth, the combination with cap-holding and clenching means, of a feed-channel, a centrifugal action device serving to deliver disks to said channel, and a plunger operative to deliver the disks to the vicinity of the cap-clenching means.

31. In a machine for the purpose set forth, the combination of upper and lower cap-holding and clenching dies, the lower die being annular, a vertically-movable cork-elevating plunger working through said lower die, a feed-channel intersecting the path of said plunger, a plunger working in said feed-channel, and a centrifugal action device serving to deliver disks from bulk to said second-named plunger.

32. In a machine for the purpose set forth, the combination of upper and lower cap-holding and clenching dies, the lower die being annular, a vertically-movable cork-elevating plunger working through said lower die, a feed-channel intersecting the path of the plunger, a plunger working in said feed-channel, a centrifugal action device adapted to receive disks in bulk and deliver them in a row, a channel disposed above said feed-channel and receiving disks from said centrifugal action device, and a plunger operative to lower the disks in succession into the path of the first-named plunger.

33. In a machine for the purpose set forth, the combination with cap-supporting and clenching means, of a vertically-reciprocating cork-elevating plunger, a feed-channel intersecting the path of said plunger, a second plunger working in said feed-channel, a stationary hopper having a rotary bottom disk, a cork-channel diverging from said hopper, and means for transferring the cork-disks from said cork-channel to said feed-channel.

34. In a machine for the purpose set forth, the combination with cap-clenching dies, of a disk-lifting plunger, a reciprocating slide equipped with a plunger adapted to deliver disks to the path of said first-named plunger, a cork-channel disposed above said slide, a pivotally mounted arm equipped with a plunger adapted to deliver corks to said second-named plunger, said arm actuated through the medium of said slide, and a hopper equipped with a rotary disk adapted to deliver corks to said cork-channel.

35. In a machine of the character set forth, the combination with means for blanking and flanging a cap, of clenching dies, and means for delivering corks to the clenching dies, including a centrifugal action device operative to receive the corks in bulk and deliver them in a row from which they are delivered singly to the clenching-dies.

36. In a machine of the character set forth, the combination of a bed, a reciprocatory carrier provided with transverse transfer-pockets and provided also between two of said transfer-pockets with a folder-opening, a female blanking-die mounted on said bed above said carrier and adapted to produce a double-disk blank, a cross-head equipped with a coöperating blanking punch, a lower ring-piercing die beneath said carrier, lower cap-flanging and beading and tab-beading dies mounted in said bed beneath said carrier, a cross-head above said carrier equipped with a ring-piercing punch and equipped also with cap-flanging and beading and tab-beading punches, and a folder mounted in said bed beneath said carrier and adapted to operate through the folder-opening of the carrier to fold one disk of the blank on the other disk.

37. In a machine of the character set forth, the combination of a bed equipped with a series of lower dies and with a vertically movable folder, a pair of blanking-dies adapted to produce double-disk blanks, a reciprocatory carrier mounted on said bed and operative to advance the blanks step-by-step, said carrier having an opening through which the folder may operate, a carrier-actuated anvil co-acting with the folder, a cross-head located above said bed and equipped with upper dies co-acting with said lower dies, one of said cross-heads carrying also a punch adapted to lower the blanks to the folder.

38. In a machine of the character set forth, the combination of a bed equipped with a series of lower dies and with a folder finger, a reciprocatory carrier mounted on said bed and having blank-receiving transfer pockets adapted to advance the blanks step-by-step and having, also, an opening through which the folder finger may operate, certain of said pockets being disposed transversely and adapted to receive a double-disk blank disposed transversely of the carrier, an anvil mounted at one edge of the carrier and adapted to move to a position above said opening when the carrier is in one position, and a series of cross-heads located above said carrier and equipped with upper dies coacting with said lower dies, one of said cross-heads carrying also a punch adapted to lower the blanks to the path of the folder finger, said dies including a pair of blanking-dies adapted to produce double-disk blanks and deliver them to a pocket of said carrier.

39. In a machine of the character set forth, the combination of a bed equipped with a series of lower dies and with a folder finger, a reciprocatory carrier mounted on said bed and having blank-receiving transfer-pockets adapted to advance the blanks step-by-step and having, also, an opening through which the folder finger may operate, certain of said pockets being disposed transversely and adapted to receive a double-disk blank disposed transversely of the carrier, an anvil mounted at one edge of the carrier and adapted to move to a position above said opening when the carrier is in one position, a series of cross-heads located above said carrier and equipped with upper dies co-acting with said lower dies, one of said cross-heads carrying also a punch adapted to lower the blanks to the path of the folder-finger, said dies including a pair of blanking-dies adapted to produce double-disk blanks and deliver them to a pocket of said carrier, a lower ring-flanging die beneath said carrier in the rear of said folder finger, and a coöperating upper ring-flanging punch.

40. In a stopper-making machine, the combination with means for producing a double-disk blank, of a folder comprising a vertically movable plunger having a blank-socket and adapted to support a double-disk blank, an anvil adapted to move to a position above one disk of the blank, a second plunger, and a rock-member mounted thereon and having a heel adapted to engage a shoulder of the first-named plunger, thereby to swing the rock-member and cause it to fold the other disk over said anvil.

41. In a stopper-making machine, the combination of upper and lower cap-holding and clenching dies, the lower die being annular, a vertically movable cork-elevating plunger working through said lower die, a feed-channel intersecting the path of said plunger and means for introducing cork-disks through said feed-channel into the path of the cork-elevating plunger.

42. In a stopper-making machine, the combination of blank-punching means adapted to produce a pair of web-connected disks, means for beading and down-flanging one disk to produce a cap, means for ring-piercing and tab-beading the other disk to produce a tab-equipped retainer-ring, and means serving to fold the retainer-ring upon the cap and center the tab thereof on the cap-disk body.

WILLIAM SAMUEL DORMAN.
ROBERT CYRUS MANVILLE.

In presence of—
CLAYTON F. McKENLY,
HARRY M. BROWN.

---

Copies of this patent may be obtained for five cents each, by addressing the "Commissioner of Patents, Washington, D. C."